US009460696B2

(12) United States Patent
Hiratsuka

(10) Patent No.: US 9,460,696 B2
(45) Date of Patent: Oct. 4, 2016

(54) DISPLAYING CONTENT IN RELATION TO MUSIC REPRODUCTION BY MEANS OF INFORMATION PROCESSING APPARATUS INDEPENDENT OF MUSIC REPRODUCTION APPARATUS

(71) Applicant: YAMAHA CORPORATION, Hamamatsu-shi, Shizuoka-ken (JP)

(72) Inventor: Satoshi Hiratsuka, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 0 days.

(21) Appl. No.: 14/571,618

(22) Filed: Dec. 16, 2014

(65) Prior Publication Data

US 2015/0096432 A1    Apr. 9, 2015

Related U.S. Application Data

(62) Division of application No. 13/626,018, filed on Sep. 25, 2012, now Pat. No. 9,040,801.

(30) Foreign Application Priority Data

Sep. 25, 2011 (JP) .................. 2011-208307
Sep. 26, 2011 (JP) .................. 2011-209117

(51) Int. Cl.
*G09B 15/00*  (2006.01)
*G09B 15/02*  (2006.01)
(Continued)

(52) U.S. Cl.
CPC .............. *G10H 1/0066* (2013.01); *G10G 1/02* (2013.01); *G10H 1/368* (2013.01); *G10H 2220/011* (2013.01); *G10H 2220/015* (2013.01)

(58) Field of Classification Search
CPC .............. G06F 8/63; G06F 17/30247; G06F 17/30557; G10H 2240/056; G10H 1/0066; G10H 2240/061; G10H 2240/145; G10H 2240/311; G10H 2240/131; G10H 2240/115; G10H 2240/135; G10H 1/0033; G10H 2240/125; G10H 2220/011; G10H 2220/091
See application file for complete search history.

(56) References Cited

U.S. PATENT DOCUMENTS 4,680,740 A    7/1987 Treptow
4,964,000 A    10/1990 Kanota et al.
(Continued)

FOREIGN PATENT DOCUMENTS

CN    101983403 A    3/2011
CN    102208203 A    10/2011
(Continued)

OTHER PUBLICATIONS

Japanese Office Action issued in application No. JP2011-209117, dated Sep. 10, 2013. Cited in parent U.S. Appl. No. 13/626,018.
(Continued)

*Primary Examiner* — Marlon Fletcher
(74) *Attorney, Agent, or Firm* — Rossi, Kimms & McDowell LLP

(57) ABSTRACT

A music reproduction apparatus includes a reproduction section for reproducing user-selected music piece data, a generation section for generating control information including music piece information identifying a music piece reproduced by the reproduction section and reproduced position information indicative of a currently-reproduced position, a modulation section for outputting, on the basis of the generated control information, an audio signal of a predetermined frequency band for carrying the control information, and an output section for transmitting to outside the audio signal generated by the modulation section. An information processing apparatus stores a plurality of sets of displaying content, receives the audio signal, demodulates the control information from the received audio signal to extract the music piece information and reproduced position information, identifies displaying content from the extracted music piece information, and displays a part of the identified displaying content in accordance with the extracted reproduced position information.

8 Claims, 11 Drawing Sheets

(51) Int. Cl.
  *G10H 1/00* (2006.01)
  *G10H 1/36* (2006.01)
  *G10G 1/02* (2006.01)

(56) References Cited

U.S. PATENT DOCUMENTS

| | | |
|---|---|---|
| 5,025,702 A | 6/1991 | Oya |
| 5,056,402 A | 10/1991 | Hikawa et al. |
| 5,212,551 A | 5/1993 | Conanan |
| 5,414,567 A | 5/1995 | Amada et al. |
| 5,423,073 A | 6/1995 | Ogawa |
| 5,428,183 A | 6/1995 | Matsuda et al. |
| 5,608,807 A | 3/1997 | Brunelle |
| 5,612,943 A | 3/1997 | Moses et al. |
| 5,637,821 A | 6/1997 | Izumisawa et al. |
| 5,637,822 A | 6/1997 | Utsumi et al. |
| 5,670,732 A | 9/1997 | Utsumi et al. |
| 5,684,261 A | 11/1997 | Luo |
| 5,728,960 A * | 3/1998 | Sitrick ............... G09B 15/023 84/464 R |
| 5,857,171 A | 1/1999 | Kageyama et al. |
| 5,886,275 A | 3/1999 | Kato et al. |
| 5,889,223 A | 3/1999 | Matsumoto |
| 6,141,032 A | 10/2000 | Priest |
| 6,248,945 B1 | 6/2001 | Sasaki |
| 6,266,430 B1 | 7/2001 | Rhoads |
| 6,304,523 B1 | 10/2001 | Jones et al. |
| 6,326,537 B1 | 12/2001 | Tamura |
| 6,429,365 B1 | 8/2002 | Ide et al. |
| 6,462,264 B1 | 10/2002 | Elam |
| 6,621,881 B2 | 9/2003 | Srinivasan |
| 6,965,682 B1 | 11/2005 | Davis et al. |
| 6,970,517 B2 | 11/2005 | Ishii |
| 7,009,942 B2 | 3/2006 | Fujimori et al. |
| 7,026,537 B2 | 4/2006 | Ishii |
| 7,078,608 B2 | 7/2006 | Aiso et al. |
| 7,161,079 B2 | 1/2007 | Nishitani et al. |
| 7,164,076 B2 | 1/2007 | McHale et al. |
| 7,181,022 B2 | 2/2007 | Rhoads |
| 7,375,275 B2 | 5/2008 | Matsuoka et al. |
| 7,415,129 B2 | 8/2008 | Rhoads |
| 7,433,846 B2 | 10/2008 | Umeo et al. |
| 7,489,978 B2 | 2/2009 | Suyama et al. |
| 7,505,605 B2 | 3/2009 | Rhoads et al. |
| 7,507,894 B2 | 3/2009 | Matsuura et al. |
| 7,531,736 B2 | 5/2009 | Honeywell |
| 7,546,173 B2 | 6/2009 | Waserblat et al. |
| 7,554,027 B2 | 6/2009 | Moffatt |
| 7,562,392 B1 | 7/2009 | Rhoads et al. |
| 7,572,968 B2 | 8/2009 | Komano |
| 7,620,468 B2 | 11/2009 | Shimizu |
| 7,630,282 B2 | 12/2009 | Tanaka et al. |
| 7,750,228 B2 | 7/2010 | Fujishima et al. |
| 7,799,985 B2 | 9/2010 | Yanase et al. |
| 8,023,692 B2 | 9/2011 | Rhoads |
| 8,103,542 B1 | 1/2012 | Davis et al. |
| 8,116,514 B2 | 2/2012 | Radzishevsky |
| 8,126,200 B2 | 2/2012 | Rhoads |
| 8,165,341 B2 | 4/2012 | Rhoads |
| 8,180,844 B1 | 5/2012 | Rhoads |
| 8,204,222 B2 | 6/2012 | Rhoads |
| 8,618,404 B2 | 12/2013 | O'Dwyer |
| 8,688,250 B2 | 4/2014 | Iwase et al. |
| 8,697,975 B2 | 4/2014 | Iwase et al. |
| 8,737,638 B2 | 5/2014 | Sakurada et al. |
| 2001/0007221 A1 | 7/2001 | Uehara |
| 2001/0021188 A1 | 9/2001 | Fujimori et al. |
| 2001/0023633 A1 | 9/2001 | Matsumoto |
| 2001/0037721 A1 | 11/2001 | Hasegawa et al. |
| 2001/0053190 A1 | 12/2001 | Srinivasan |
| 2001/0055464 A1 | 12/2001 | Miyaki et al. |
| 2002/0026867 A1 | 3/2002 | Hasegawa et al. |
| 2002/0048224 A1 | 4/2002 | Dygert et al. |
| 2002/0078146 A1 | 6/2002 | Rhoads |
| 2002/0156547 A1 | 10/2002 | Suyama et al. |
| 2002/0166439 A1 | 11/2002 | Nishitani et al. |
| 2003/0110926 A1* | 6/2003 | Sitrick ............... G09B 15/023 84/477 R |
| 2003/0161425 A1 | 8/2003 | Kikuchi |
| 2003/0167903 A1* | 9/2003 | Funaki ............... G09B 15/003 84/477 R |
| 2003/0190155 A1 | 10/2003 | Tsutsui et al. |
| 2003/0195851 A1 | 10/2003 | Ong |
| 2003/0196540 A1 | 10/2003 | Ishii |
| 2003/0200859 A1 | 10/2003 | Futamase et al. |
| 2004/0094020 A1 | 5/2004 | Wang et al. |
| 2004/0112201 A1* | 6/2004 | Funaki ............... G10H 1/0008 84/477 R |
| 2004/0137929 A1 | 7/2004 | Jones et al. |
| 2004/0159218 A1 | 8/2004 | Aiso et al. |
| 2005/0033699 A1 | 2/2005 | Umeo et al. |
| 2005/0071763 A1 | 3/2005 | Hart et al. |
| 2005/0154908 A1 | 7/2005 | Okamoto |
| 2005/0155484 A1* | 7/2005 | Yanase ............... G10H 1/0058 84/615 |
| 2005/0211068 A1 | 9/2005 | Zar |
| 2005/0255914 A1 | 11/2005 | McHale et al. |
| 2006/0009979 A1 | 1/2006 | McHale et al. |
| 2006/0054008 A1 | 3/2006 | Yanase et al. |
| 2006/0078305 A1 | 4/2006 | Arora et al. |
| 2006/0133624 A1 | 6/2006 | Waserblat et al. |
| 2006/0219090 A1 | 10/2006 | Komano |
| 2006/0239503 A1 | 10/2006 | Petrovic et al. |
| 2006/0248173 A1 | 11/2006 | Shimizu |
| 2007/0074622 A1 | 4/2007 | Honeywell |
| 2007/0149114 A1 | 6/2007 | Danilenko |
| 2007/0169615 A1 | 7/2007 | Chidlaw et al. |
| 2007/0209498 A1 | 9/2007 | Lindgren et al. |
| 2007/0256545 A1 | 11/2007 | Lee et al. |
| 2007/0286423 A1 | 12/2007 | Soda et al. |
| 2008/0011149 A1 | 1/2008 | Eastwood et al. |
| 2008/0053293 A1 | 3/2008 | Georges et al. |
| 2008/0063226 A1 | 3/2008 | Koyama et al. |
| 2008/0101635 A1 | 5/2008 | Dijkstra et al. |
| 2008/0105110 A1 | 5/2008 | Pietrusko et al. |
| 2008/0119953 A1 | 5/2008 | Reed et al. |
| 2008/0161956 A1 | 7/2008 | Tohgi et al. |
| 2008/0178726 A1 | 7/2008 | Honeywell |
| 2009/0132077 A1 | 5/2009 | Fujihara et al. |
| 2010/0023322 A1 | 1/2010 | Schnell et al. |
| 2010/0045681 A1 | 2/2010 | Weissmueller, Jr. et al. |
| 2010/0132536 A1 | 6/2010 | O'Dwyer |
| 2010/0208905 A1 | 8/2010 | Franck et al. |
| 2010/0251876 A1 | 10/2010 | Wilder |
| 2010/0280907 A1 | 11/2010 | Wolinsky et al. |
| 2011/0023691 A1 | 2/2011 | Iwase et al. |
| 2011/0028160 A1 | 2/2011 | Roeding et al. |
| 2011/0029359 A1 | 2/2011 | Roeding et al. |
| 2011/0029362 A1 | 2/2011 | Roeding et al. |
| 2011/0029364 A1 | 2/2011 | Roeding et al. |
| 2011/0029370 A1 | 2/2011 | Roeding et al. |
| 2011/0066437 A1 | 3/2011 | Luff |
| 2011/0103591 A1 | 5/2011 | Ojala |
| 2011/0167390 A1 | 7/2011 | Reed, Jr. et al. |
| 2011/0174137 A1 | 7/2011 | Okuyama et al. |
| 2011/0209171 A1 | 8/2011 | Weissmueller, Jr. et al. |
| 2011/0290098 A1 | 12/2011 | Thuillier |
| 2011/0319160 A1 | 12/2011 | Arn et al. |
| 2012/0064870 A1 | 3/2012 | Chen et al. |
| 2012/0065750 A1 | 3/2012 | Tissier et al. |
| 2013/0077447 A1* | 3/2013 | Hiratsuka ............ G10H 1/0066 367/199 |
| 2013/0079910 A1* | 3/2013 | Hiratsuka ............ G10H 1/0008 700/94 |
| 2013/0179175 A1 | 7/2013 | Biswas et al. |
| 2013/0243203 A1 | 9/2013 | Franck et al. |
| 2013/0282368 A1 | 10/2013 | Choo et al. |
| 2013/0305908 A1 | 11/2013 | Iwase et al. |
| 2014/0013928 A1 | 1/2014 | Iwase et al. |

(56) References Cited

U.S. PATENT DOCUMENTS

| | | |
|---|---|---|
| 2014/0040088 A1 | 2/2014 | King et al. |
| 2014/0049691 A1* | 2/2014 | Burdzinski ............ H04N 5/44 |
| | | 348/563 |

FOREIGN PATENT DOCUMENTS

| | | |
|---|---|---|
| EP | 1422689 A1 | 5/2004 |
| EP | 1505476 A2 | 2/2005 |
| EP | 2261896 A1 | 12/2010 |
| EP | 2312763 A1 | 4/2011 |
| JP | 63128810 A | 6/1988 |
| JP | 5091063 A | 4/1993 |
| JP | 07240763 A | 9/1995 |
| JP | 08286687 A | 11/1996 |
| JP | 10093449 A | 4/1998 |
| JP | 2000020054 A | 1/2000 |
| JP | 2000056872 A | 2/2000 |
| JP | 2000181447 A | 6/2000 |
| JP | 2001008177 A | 1/2001 |
| JP | 2001203732 A | 7/2001 |
| JP | 2001265325 A | 9/2001 |
| JP | 2001356767 A | 12/2001 |
| JP | 2002175089 A | 6/2002 |
| JP | 2002229576 A | 8/2002 |
| JP | 2002314980 A | 10/2002 |
| JP | 2002341865 A | 11/2002 |
| JP | 2003280664 A | 10/2003 |
| JP | 2003295894 A | 10/2003 |
| JP | 2003316356 A | 11/2003 |
| JP | 2004126214 A | 4/2004 |
| JP | 2004341066 A | 12/2004 |
| JP | 2005122709 A | 5/2005 |
| JP | 2005274851 A | 10/2005 |
| JP | 2006100945 A | 4/2006 |
| JP | 2006163435 A | 6/2006 |
| JP | 2006251676 A | 9/2006 |
| JP | 2006287301 A | 10/2006 |
| JP | 2006287730 A | 10/2006 |
| JP | 2006323161 A | 11/2006 |
| JP | 2006337483 A | 12/2006 |
| JP | 2007104598 A | 4/2007 |
| JP | 2007249033 A | 9/2007 |
| JP | 4030036 B2 | 1/2008 |
| JP | 2008072399 A | 3/2008 |
| JP | 2008-126617 A | 6/2008 |
| JP | 2008216889 A | 9/2008 |
| JP | 2008224707 A | 9/2008 |
| JP | 2008228133 A | 9/2008 |
| JP | 2008286946 A | 11/2008 |
| JP | 2010206568 A | 9/2010 |
| JP | 2010276950 A | 12/2010 |
| WO | 0008909 A2 | 2/2000 |
| WO | 2005018097 A2 | 2/2005 |
| WO | 2005055194 A1 | 6/2005 |
| WO | 2010127268 A1 | 11/2010 |
| WO | 2011014292 A1 | 2/2011 |

OTHER PUBLICATIONS

Japanese Office Action issued in application No. JP2011-208307, dated Sep. 24, 2013. Cited in parent U.S. Appl. No. 13/626,018.
Office Action issued in parent U.S. Appl. No. 13/626,018, dated Sep. 24, 2014.
Notification of Reasons for Refusal for JP2008-331081, mailed Mar. 5, 2013. Cited in related co-pending U.S. Appl. No. 13/955,451.
International Search Report for PCT/JP2009/063513, mailed Nov. 2, 2009. Cited in related co-pending U.S. Appl. No. 13/955,451.
International Search Report for PCT/JP2009/063510, mailed Sep. 8, 2009. Cited in related co-pending U.S. Appl. No. 13/955,451.
Yamaha Digital Mixing Console Owner's Manual 2006. Cited in related co-pending U.S. Appl. No. 13/955,451.
Notification of Reasons for Refusal for corresponding JP2008-196492 mailed Oct. 1, 2013. Cited in related co-pending U.S. Appl. No. 13/955,451.
Notification of Reasons for Refusal for corresponding JP2008-253532 mailed Oct. 1, 2013. Cited in related co-pending U.S. Appl. No. 13/955,451.
Extended European Search Report for EP09802994.5 mailed Oct. 17, 2013. Cited in related co-pending U.S. Appl. No. 13/955,451.
Ryuki Tachibana, "Audio Watermarking for Live Performance"; Proceedings of SPIE-IS&T Electronic Imaging, SPIE vol. 5020; pp. 32-43, 2003. Cited in related co-pending U.S. Appl. No. 13/955,451.
Extended European Search Report for EP09802996.0 mailed Mar. 27, 2013. Cited in related co-pending U.S. Appl. No. 13/955,451.
Office Action issued in JP2008-331081 mailed Jun. 18, 2013. Cited in related co-pending U.S. Appl. No. 13/955,451.
Office Action issued in JP2009-171319 mailed Sep. 17, 2013. Cited in related co-pending U.S. Appl. No. 13/955,451.
Office Action issued in JP2009-171320 mailed Sep. 17, 2013. Cited in related co-pending U.S. Appl. No. 13/955,451.
Office Action issued in JP2009-171321 mailed Sep. 10, 2013. Cited in related co-pending U.S. Appl. No. 13/955,451.
Extended European Search Report issued in EP14169714.4 mailed Aug. 18, 2014. Cited in related co-pending U.S. Appl. No. 13/955,451.
Office Action issued in U.S. Appl. No. 13/071,821 mailed Jan. 28, 2013. Cited in related co-pending U.S. Appl. No. 13/955,451.
Notice of Allowance issued in U.S. Appl. No. 13/071,821 mailed Jun. 25, 2013. Cited in related co-pending U.S. Appl. No. 13/955,451.
Notice of Allowance issued in U.S. Appl. No. 13/071,821 mailed Nov. 22, 2013. Cited in related co-pending U.S. Appl. No. 13/955,451.
Office Action issued in U.S. Appl. No. 13/733,950 mailed Dec. 24, 2013. Cited in related co-pending U.S. Appl. No. 13/955,451.
Office Action issued in U.S. Appl. No. 13/733,950 mailed Aug. 7, 2014. Cited in related co-pending U.S. Appl. No. 13/955,451.
Japanese Office Action cited in JP2012000911, dated Nov. 26, 2013. English translation of relevant portion provided. Cited in related co-pending U.S. Appl. No. 13/955,451.
Jonti Olds, "J-QAM—A QAM Soundcard Modern", Archive.org, Nov. 26, 2011, XP055090998. Retrieved on Dec. 12, 2013. Cited in related co-pending U.S. Appl. No. 13/955,451.
"Quadrature Amplitude Modulation", Wikipedia, Jan. 5, 2012, XP055091051, Retrieved on Dec. 2, 2013. Cited in related co-pending U.S. Appl. No. 13/955,451.
European Search Report issued in EP12197637.7 mailed Dec. 10, 2013. Cited in related co-pending U.S. Appl. No. 13/955,451.
Office Action issued in JP2009-171319 mailed May 7, 2014. English translation provided. Cited in related co-pending U.S. Appl. No. 13/955,451.
Office Action issued in U.S. Appl. No. 13/955,451 mailed Dec. 18, 2013.
Office Action issued in U.S. Appl. No. 13/955,451 mailed Jun. 6, 2014.
Extended European Search Report issued in EP11160194.4 mailed Jul. 27, 2011. Cited in related co-pending U.S. Appl. No. 14/035,081. Cited in related co-pending U.S. Appl. No. 13/995,451.
Official Action issued in JP2010-080436 mailed Apr. 1, 2014. English translation provided. Cited in related co-pending U.S. Appl. No. 14/035,081. Cited in related co-pending U.S. Appl. No. 13/955,451.
Office Action issued in U.S. Appl. No. 14/035,081 mailed Sep. 29, 2014. Cited in related co-pending U.S. Appl. No. 13/955,451.
Notice of Allowence issued in U.S. Appl. No. 13/955,451 mailed Dec. 10, 2014.
Notice of Grounds for Rejection issued in corresponding Japanese Patent Application No. 2013-232503, mailing date Jan. 13, 2015. English Translation provided.
U.S. Appl. No. 13/733,950, filed Jan. 4, 2013.
U.S. Appl. No. 14/035,081, filed Sep. 24, 2013.
U.S. Appl. No. 13/955,451, filed Jul. 31, 2013.

(56) References Cited

OTHER PUBLICATIONS

Office Action issued in Chinese Patent Application No. CN201210362872.3 mailed Apr. 20, 2016. English translation provided.

Office Action issued in Japanese Patent Application No. JP2015-112054 mailed May 17, 2016. English translation provided.

Marans, "Midisoft Studio", Keyboard, Music Player Network, vol. 19, No. 2, Feb. 1, 1993. XP000414702, ISSN: 0730-0158. pp. 138-145.

* cited by examiner

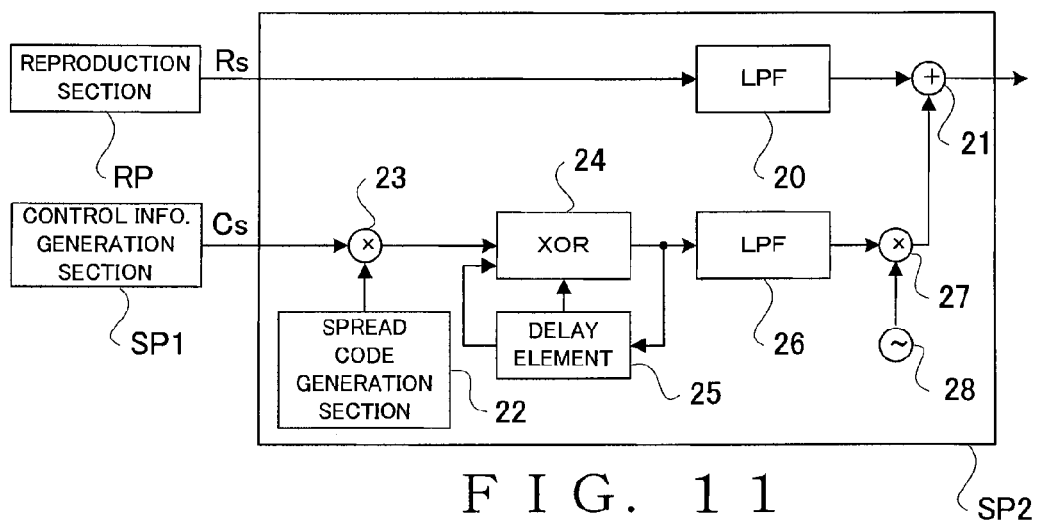
F I G. 1 1
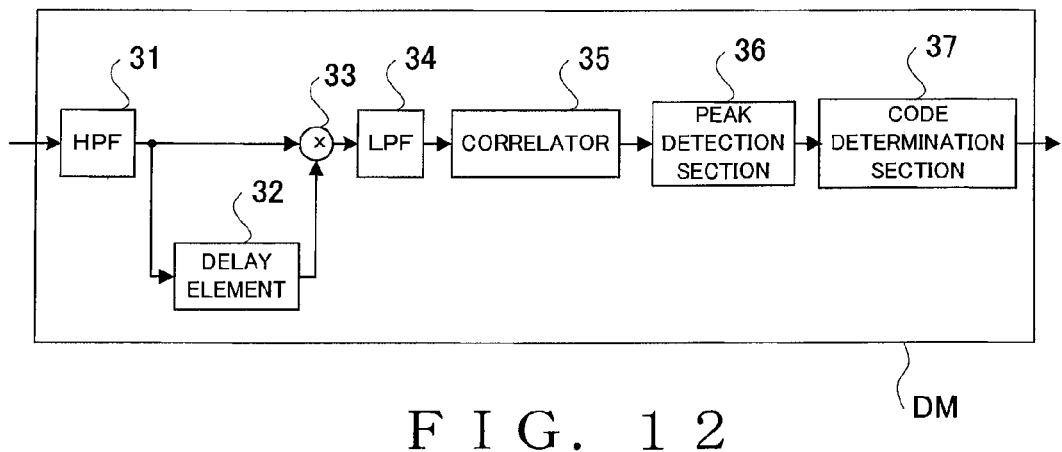
F I G. 1 2

DISPLAY CONTROL TABLE

| MEASURE NO. | 1ST ROW | 2ND ROW | 3RD ROW |
|---|---|---|---|
| 1 | 1 | 1 | 1 |
| 2 | 1 | 1 | 1 |
| 3 | 1 | 1 | 1 |
| 4 | 1 | 1 | 1 |
| 5 | 2 | 1 | 1 |
| 6 | 2 | 1 | 1 |
| 7 | 2 | 1 | 1 |
| 8 | 2 | 1 | 1 |
| 9 | 2 | 1 | 1 |
| 10 | 2 | 1 | 1 |
| 11 | 2 | 1 | 1 |
| 12 | 2 | 1 | 1 |
| 13 | 2 | 2 | 1 |
| 14 | 2 | 2 | 1 |
| 15 | 2 | 2 | 1 |
| 16 | 2 | 2 | 2 |
| 17 | 2 | 2 | 2 |
| 18 | 2 | 2 | 2 |
| 19 | : | : | : |
| 20 | : | : | : |

DISPLAYING CONTENT IN RELATION TO MUSIC REPRODUCTION BY MEANS OF INFORMATION PROCESSING APPARATUS INDEPENDENT OF MUSIC REPRODUCTION APPARATUS

BACKGROUND

The present invention relates to a technique for displaying desired content (such content will hereinafter be referred to also as "displaying content"), such as music content like a musical score, by means of an information processing apparatus (or music content display apparatus), independent of a music reproduction apparatus (or electronic music apparatus), in relation to a music piece played or reproduced by the music reproduction apparatus (or electronic music apparatus). For example, the present invention relates to a technique for displaying a musical score of a music piece reproduced by an electronic musical instrument using a portable information processing apparatus independent of the body of the electronic musical instrument and a technique for automatically switching between portions of the musical score to be displayed (so-called "score page turning") in accordance with a progression of the music piece reproduction.

Heretofore, electronic musical instruments have been known which display desired content intended for displaying (i.e., "displaying content"), such as a musical score and lyrics, on a display device provided on the body of the electronic musical instrument and automatically update the musical score and lyrics, displayed on the display device, in accordance with a progression of tones of a melody, automatic accompaniment etc. audibly generated or sounded on the basis of reproduction of user-desired music piece data. In such electronic musical instruments, musical-score-display controlling data are embedded in advance, for example, in music piece data (e.g., MIDI data) for an automatic accompaniment, and the musical score display on the display device is automatically updated in response to the musical-score-display controlling data being read out in accordance with a progression of reproduction of tones. With such an arrangement, a user itself does not have to take the trouble of turning over the pages of the musical score (i.e., does not have to perform so-called "score page turning operation"), and thus, the user can, for example, dedicate itself to practicing a performance of a melody or the like by actually operating a performance operator.

However, some electronic musical instruments have no display device or have only a small-size display device that does not have enough capability for displaying a musical score etc, in which case a musical score of course cannot be displayed on the electronic musical instrument. Thus, there has been proposed a technique for allowing an external display device, constructed independently of the body of an electronic musical instrument, to display a musical score, in order to realize a user's demand for displaying a musical score even where the electronic musical instrument has no display device or has only a small-size display device. One example of the technique for allowing an external display device to display a musical score related to tones being currently reproduced is disclosed in Japanese Patent Application Laid-open Publication No. 2001-265325 (hereinafter referred to as patent literature 1).

An apparatus disclosed in patent literature 1 is constructed to acquire, by means of a microphone, a tone including a performance sound of a musical instrument, voice, etc. audibly sounded from the body of the musical instrument via a speaker, extract a beat position and pitch through analysis of the acquired tone to thereby identify a performed position (reproduced position) of the tone, and automatically update a display of a musical score on the basis of the identified performed position (reproduced position) of the tone. Such musical score display update on the display device is realized by performing display switching control. According to the display switching control, two half pages, each including one or more measures, of a musical score are displayed simultaneously in two divided (e.g., upper and lower) display regions, and one of the upper and lower display regions, which is displaying a musical score portion for which performance has just been completed, is switched or updated to display a musical score portion of a next page of the musical score immediately following a musical score portion currently displayed in the other display region. Namely, with the musical score display control employed in the apparatus disclosed in patent literature 1, the display of each page of the musical score is updated, half page by half page, in accordance with a progression of performance of tones.

Further, Japanese Patent Application Laid-open Publication No. 2002-314980 (hereinafter referred to as patent literature 2), for example, discloses a technique where music piece information is superimposed on audio data, and where content is identified by an external device on the basis of the audio data having the music piece information superimposed thereon.

Also known today is an approach of installing in advance a music application program (software program), designed to implement a predetermined music function, in an information processing apparatus, such as a slate-type personal computer (also called "tablet terminal"), so that the information processing apparatus can operate as an external display device etc. for displaying desired content (desired displaying content), such as a musical score and lyrics, through execution of the music application program.

As noted above, with the apparatus disclosed in patent literature 1, where display control of a musical score is performed on the basis of tones audibly generated or sounded via the speaker of the electronic musical instrument, a musical score portion related to tones to be performed cannot be automatically selected and displayed before the start of a performance when the tones have not been sounded yet. Thus, there is a need for a user to manually read out a musical score portion of desired tones or a musical score portion of a performance start position of the tones prior to the start of the performance; however, because a user's operation for that purpose has to be performed separately from a music piece data selection operation, which tends to be very cumbersome.

Further, with the technique where the musical score display control is performed on the basis of performed positions of tones sounded via the speaker, particularly if a performance tempo (or reproduction tempo) is not constant or if a user's performance technique is immature, beat detection and pitch detection cannot be performed appropriately, and thus, it tends to require a long time to identify the performed positions, and the performed positions may be identified erroneously. As a consequence, this technique would present a considerable possibility that the performed positions of the tones and display update of the musical score cannot be synchronized with each other appropriately. Similarly, if a jump has been made to a performed position, discontinuous with the preceding performed position, through fast forwarding or rewinding, an operation for re-identifying the new or jumped-to performed position would take a long time so that causing the musical score to follow the performed position tends to require a long time.

Further, because the musical score display control is performed on the basis of tones (tone signals) themselves of wide audible bands which tend to be difficult to pick up via a microphone due to ambient noise and the like, the aforementioned technique cannot accurately extract performed positions of the musical score due to influences of a reception environment of the microphone, so that automatic update of the musical score would easily stagnate.

Furthermore, with the apparatus disclosed in patent literature 2, which is constructed to merely identify content and is not constructed to perform any cooperative operation between devices, it is difficult to update displaying content, such as a musical score and lyrics, displayed on the external display device in accordance with a progression of tones.

Furthermore, an electronic musical instrument disclosed, for example, in Japanese Patent Application Laid-open Publication No. 2007-249033 (patent literature 3) includes a display device, an external storage device, a communication interface (I/F), etc., so that it can display musical score data of a music piece, designated through a user's selection operation, on a screen of the display device in accordance with a progression of the music piece. Here, musical score image data for use as the musical score data may be generated from performance data of the music piece, may be generated on the basis of musical score logic data of the music piece, or may be read out from the storage device.

With the prior art technique, sets of displaying musical score data (music content) are prestored in the electronic musical instrument (electronic music apparatus), or a desired set of displaying musical score data may be downloaded by a user via the communication I/F. If the user wants to increase the number of sets of displaying musical score data from the initially-stored number, several user's operations would be required for downloading a desired set from a server. In some case, the user may acquire and store displaying musical score data from a storage medium or the like into the electronic musical instrument, but it is possible that such musical score data from the storage medium or the like do not correspond to the capability of the electronic musical instrument into which they are to be stored.

SUMMARY OF THE INVENTION

In view of the foregoing prior art problems, it is an object of the present invention to provide an improved music piece reproduction apparatus and information processing apparatus which, when displaying content related to a music piece to be reproduced is to be displayed in an updatable manner in accordance with a progression of reproduction of a music piece, can automatically display appropriate displaying content even before the start of a performance (i.e., before the start of audible generation of reproduced tones) and which can display content of an appropriate portion corresponding to a current reproduced position, as well as a system comprising a combination of such a music piece reproduction apparatus and information processing apparatus.

It is another object of the present invention to provide a system which can readily acquire displaying music content, such as musical score data, displayable on a music content display device while retaining security of content protection and can reduce a burden on a user's operation for that purpose.

It is still another object of the present invention to provide a system which can automatically acquire displaying music content corresponding to music content, such as music piece data, preset or built-in in an electronic music apparatus duly possessed by a user.

In order to accomplish the above-mentioned objects, the present invention provides an improved music reproduction apparatus, which comprises: an acquisition section configured to acquire music piece data to be reproduced; a reproduction section configured to reproduce the music piece data acquired by the acquisition section; a generation section configured to generate control information that includes music piece information identifying a music piece to be reproduced and reproduced position information indicative of a position, reproduced by the reproduction section, of the music piece data; a modulation section configured to output, on the basis of the control information generated by the generation section, an audio signal of a predetermined frequency band for carrying the control information; and an output section configured to transmit to outside the audio signal output by the modulation section.

The audio signal transmitted to outside in the aforementioned manner is received by an information processing apparatus independent of the music reproduction apparatus.

The information processing apparatus according to the present invention comprises: a storage section storing therein a plurality of sets of displaying content, each of the sets of displaying content being associated with a music piece; a display section; a reception section configure to receive from outside an audio signal of a predetermined frequency band, the audio signal carrying control information that includes music piece information identifying a music piece and reproduced position information indicative of a reproduced position of the music piece identified by the music piece information; an extraction section configured to demodulate the control information from the audio signal received by the reception section and extract the music piece information and the reproduced position information included in the demodulated control information; and a display control section configured to identify one of the sets of displaying content, stored in the storage section, in accordance with the music piece information extracted by the extraction section and display, on the display section, a part of the identified one set of the displaying content in accordance with the reproduced position information extracted by the extraction section.

Namely, the music reproduction apparatus according to the present invention is constructed to transmit to outside the audio signal carrying the control information that includes the music piece information identifying the music piece to be reproduced and the reproduced position information indicative of the reproduced position of the music piece data. The transmitted audio signal can be received by the information processing apparatus independent of the music reproduction apparatus (i.e., external to the music reproduction apparatus). The information processing apparatus demodulates the control information from the received audio signal and extracts the music piece information and the reproduced position information included in the demodulated control information, identifies displaying content in accordance with the extracted music piece information and displays a part of the identified displaying content in accordance with the extracted reproduced position information.

Thus, even where the music reproduction apparatus does not have a content display function, it can transmit control information including music piece information and reproduced position information to the external information processing apparatus having a content display function and thereby cause the information processing apparatus to display content corresponding to the transmitted control information. In this case, because the transmitted control information has the music piece information and reproduced position information already included therein, a process for identifying a current reproduced position in the present invention does not require a long time as required in the prior art technique which is constructed to identify a performed position (reproduced position) of a tone by analyzing a reproduced tone signal, and besides, the present invention can accurately identify the reproduced position. Namely, unlike the prior art technique, the present invention does not require a long time to identify the reproduced position and can eliminate a possibility of erroneously identifying the reproduced position. Thus, particularly, in a case where a reproduction tempo is not constant, where reproduction is started at a halfway position of a music piece, or the like, the present invention allows a display of the content to accurately follow a reproduced position of a tone. Further, because the audio signal of the predetermined frequency band is used as the carrier signal for carrying the control information, the present invention is insusceptible to influences of noise as compared to the prior art technique which is constructed to identify a performed position by analyzing a tone signal of a wide frequency band. Therefore, even in a bad reception environment, the present invention is insusceptible to influences of the bad reception environment and thus can constantly display accurate reproduced positions. Consequently, as displaying content related to a music piece is updated in accordance with a progression of reproduction of the music piece, the present invention can display an appropriate content portion corresponding to a current reproduced position. Thus, by combining a music reproduction apparatus that is constructed in the aforementioned manner and does not have a musical score display function (one embodiment of which is, for example, an electronic musical instrument) with an information processing apparatus that is constructed in the aforementioned manner (one embodiment of which is, for example, a portable PDA), the present invention can not only implement the musical score display function but also implement a function of automatically turning over pages of the displayed musical score in accordance with a progression of reproduction.

In an embodiment, the information processing apparatus further comprises: an interface configured to provide communication with a server for supplying displaying content via a communication network; a determination section configured to determine whether the audio signal received by the reception section satisfies a predetermined condition; and an additional acquisition section configured to, when the determination section has determined that the audio signal satisfies the predetermined condition, access, via the interface, the server to acquire additional displaying content from the server, the additional displaying content acquired by the additional acquisition section being additionally stored into the storage section. With such arrangements, the present invention can eliminate a need for prestoring a multiplicity of items or sets of displaying content in the storage section of the information processing apparatus; namely, whenever needed, the information processing apparatus can acquire additional displaying content from the server and store the acquired additional displaying content into the storage section thereof. For example, if it has been determined that the predetermined condition is satisfied at a stage when the information processing apparatus is about to communicate with the music reproduction apparatus in order to use the display function, the information processing apparatus can acquire additional displaying content from the server and store the acquired additional displaying content into the storage section. Thus, security can be secured in such a manner as to protect the displaying content from illegal downloading.

According to another aspect of the present invention, there is provided an improved music content display apparatus which operates in relation to an external electronic music apparatus, and which comprises: a storage section storing therein displaying content related to music; an interface configured to provide communication with a server for supplying displaying content via a communication network; a reception section configured to receive a signal transmitted by the electronic music apparatus; a determination section configured to determine whether the signal received by the reception section satisfies a predetermined condition; an additional acquisition section configured to, when the determination section has determined that the signal satisfies the predetermined condition, access, via the interface, the server for acquiring additional displaying content from the server, the additional displaying content acquired by the additional acquisition section being additionally stored into the storage section; and a display control section configured to selectively read out the displaying content from the storage section and display the read-out displaying content on a display section. With such arrangements, the present invention can eliminate a need for prestoring a multiplicity of items or sets of displaying content in the storage section of the music content display apparatus; namely, whenever needed, the music content display apparatus can acquire additional displaying content from the server and store the acquired additional displaying content into the storage section. For example, if it has been determined that the predetermined condition is satisfied at a state when the music content display apparatus is about to communicate with the electronic music apparatus in order to use the display function, the music content display apparatus can acquire additional displaying content from the server and store the acquired additional displaying content into the storage section.

In an embodiment, displaying content smaller in number than displaying content usable by the external electronic music apparatus is preset in the storage section, and the additional displaying content is displaying content other than the preset displaying content and usable by the external electronic music apparatus.

In an embodiment, the reception section receives, from the external electronic music apparatus, a signal including control information for controlling a display of displaying content, and the display control section performs control to display the displaying content corresponding to the control information.

In an embodiment, the predetermined condition includes at least a condition that the control information is included in the received signal.

Namely, according to the present invention, when it has been automatically recognized that the music content display apparatus is in a state capable of communicating with the electronic music apparatus, the music content display apparatus downloads, from the server, additional displaying content corresponding to the electronic music apparatus. Further, for a same music piece, reproduction-related music content (i.e., reproducing music piece data, such as audio data and MIDI data) is prestored in the electronic music apparatus, while displaying content (i.e., displaying music-piece-associated data, such as musical score data and music-piece guiding illustration data) is stored in the music content display apparatus. The displaying content downloaded as above is displaying music-piece-associated data that is stored into the music content display apparatus.

Therefore, according to the present invention, displaying content, such as musical score data, to be displayed on the music content display apparatus can be readily acquired, which can significantly reduce a burden on a user's operation. Further, only displaying content related to both the electronic music apparatus and the music content display apparatus can be stored into the storage section of the music content display apparatus, which can achieve an enhanced efficiency and minimized waste. Further, downloading of displaying content, such as musical score data, does not influence a content storage device of the corresponding electronic music apparatus. Furthermore, displaying content, such as musical score data, downloaded by the music content display apparatus necessarily corresponds to the electronic music apparatus which the music content display apparatus is dependent on, so that the music content display apparatus can automatically acquire displaying content, such as music piece data, preset or built-in in the electronic music apparatus, duly possessed by the user in question, while appropriately securing protection of displaying content from illegal downloading and retaining security. Furthermore, the present invention can add necessary displaying content to the music content display apparatus by merely powering on the electronic music apparatus and the music content display apparatus and placing these two apparatus relatively close to each other, without interconnecting the two apparatus.

The present invention may be constructed and implemented not only as the apparatus invention discussed above but also as a method invention. Also, the present invention may be arranged and implemented as a software program for execution by a processor, such as a computer or DSP, as well as a non-transitory storage medium storing such a software program. In this case, the program may be provided to a user in the storage medium and then installed into a computer of the user, or delivered from a server apparatus to a computer of a client via a communication network and then installed into the client's computer. Further, the processor used in the present invention may comprise a dedicated processor with dedicated logic built in hardware, not to mention a computer or other general-purpose processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 11 is a block diagram showing an example construction of a modulation section shown in FIG. 2;

FIG. 12 is a block diagram showing an example construction of a demodulation section shown in FIGS. 3 and 4;

DETAILED DESCRIPTION

Example System Construction and Hardware Construction

Figure 1:
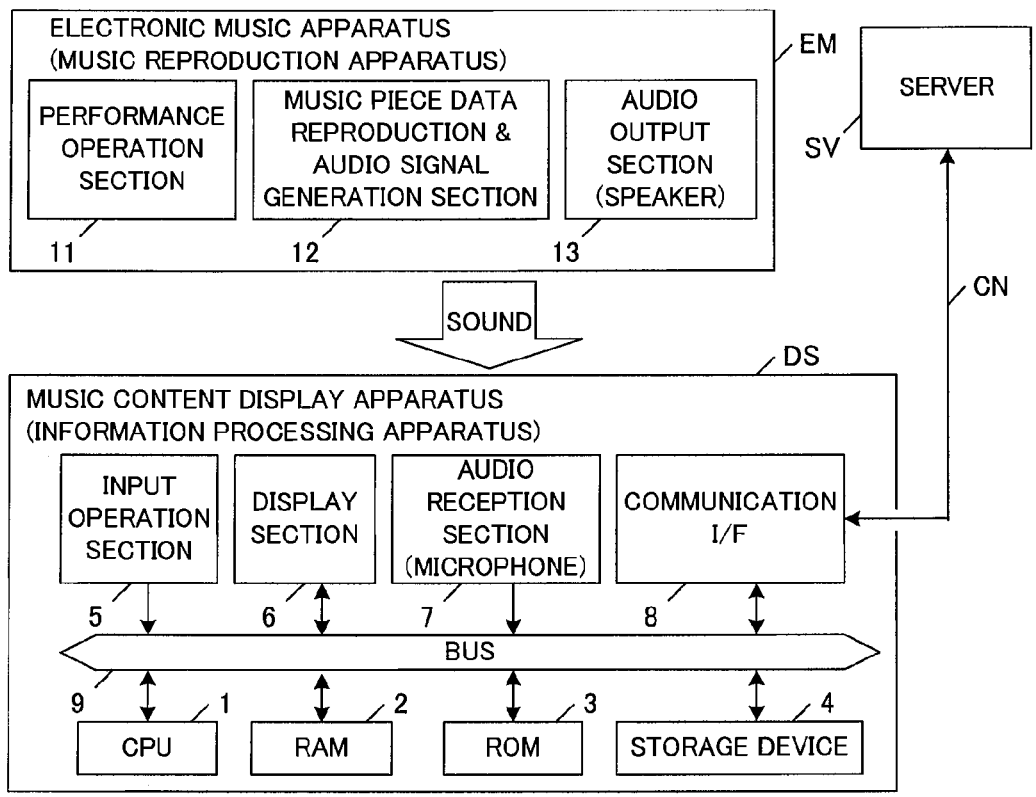
FIG. 1 is a block diagram showing an example construction of a music content display system according to a preferred embodiment of the present invention.

FIG. 1 is a block diagram showing an example construction of a music content display system according to a preferred embodiment of the present invention, which comprises a music content display apparatus DS and a predetermined electronic music apparatus EM which the music content display apparatus DS is depended on. For example, a personal information processing apparatus, such as a tablet (touch panel) type portable information terminal (mobile PDA) or smart phone, is used as the music content display apparatus DS, and an electronic musical instrument is used as the electronic music apparatus EM. The electronic music apparatus EM includes functions of a music reproduction apparatus of the present invention and constitutes an embodiment of the music reproduction apparatus of the present invention. Further, in the instant music content display system, the electronic music apparatus (i.e., music reproduction apparatus) EM does not have a function for displaying desired displaying content, such as musical score data and causes the music content display apparatus (information processing apparatus) DS, independent of (i.e., external to) the electronic music apparatus (i.e., music reproduction apparatus) EM, to perform, for the electronic music apparatus (i.e., music reproduction apparatus) EM, the function for displaying desired displaying content, such as musical score data.

The music content display apparatus (i.e., information processing apparatus) DS includes, as its hardware components, a central processing unit (CPU) 1, a random access memory (RAM) 2, a read-only memory (ROM) 3, a storage device 4, an input operation section 5, a display section 6, an audio reception section (audio input section) 7, a communication interface (I/F) 8, etc. and these components are interconnected via a bus 9.

The CPU 1, which controls the entire music content display apparatus DS, constitutes a data processing section for performing various processing in accordance with various control programs including a music content display processing program. The RAM 2 is used for temporarily storing various data necessary for these processing, and, at the time of music content display processing based on the music content display processing program, a score page turning signal reception counter for counting the number of times of reception of a score page turning signal (hereinafter referred to as "score page turning signal reception count") is provided in the RAM 2. Further, predetermined control programs and controlling data are stored in the ROM 3.

The storage device 4, which includes a storage medium, such as a flash memory, and a drive therefor, can store control programs and various data into the storage medium. The storage medium may be of a removable type or may be built in the music content display apparatus DS. Further, applications, such as the music content display processing program, can be stored in the storage device 4 together with music piece data, such as musical score data (more specifically, one or more sets of musical score data, or one or more musical score data sets). Particularly, a displaying content storage section (STd) is provided in the storage device 4 for storing displaying content (i.e., music content for display), such as musical score data for display.

The input operation section (setting operation section) 5 detects a setting operation performed via a setting operator, such as a switch, and introduces various setting information, corresponding to the detected setting operation, to the data processing section. The display section 6 is constructed to control displayed content on a display device, such as an LCD, in accordance with an instruction given from the CPU 1. The display section 6 is also constructed to provide displays for assisting in various setting operations and graphically display desired displaying content, such as a musical score. In the following description, let it be assumed that the display section 6 is constructed as a touch-panel type display having functions of setting operators and display device integrated therein. The audio reception section (audio input section) 7 includes a microphone and an audio signal input section, and it can introduce an audio signal, input from the electronic music apparatus EM via the microphone into the data processing section via an audio signal input section.

The communication I/F 8 includes a wired IF for music, such as a MIDI I/F, a general-purpose network I/F, such as a USB I/F, and a general-purpose near field wireless I/F, such as a wireless LAN, so that it can communicate with a server SV via a network CN. For example, the communication I/F 8 can acquire music content for performance and/or display, such as music piece data and music-piece guiding illustration data, and store the thus-acquired music content into the storage device 4.

The electronic music apparatus (i.e., music reproduction apparatus) EM may comprise generally the same hardware components as the music content display apparatus DS. In addition to such hardware components, the electronic music apparatus EM further includes, among other things: a performance operation section 11 for detecting a performance operation performed via a performance operator, such as a keyboard; a music piece data reproduction and audio signal generation section 12 for performing a music piece data reproduction process to generate a tone signal indicative of reproduced or performed music piece data; and an audio output section 13 for outputting a generated audio signal as sound waves through a speaker. Note, however, the electronic music apparatus (i.e., music reproduction apparatus) EM need not necessarily include the audio input section, and the display section of the electronic music apparatus EM may be of a lower grade. Namely, although the electronic music apparatus (i.e., music reproduction apparatus) EM too includes a display device, the display device of the electronic music apparatus (i.e., music reproduction apparatus) EM is of a simpler construction than the display section 6 of the music content display apparatus (information processing apparatus) DS and of a type incapable of graphically displaying desired displaying content (such as a musical score). Note that the performance operation section 11 may be any desired type of musical instrument other than a keyboard instrument, such as a string instrument, wind instrument or percussion instrument. Further, the electronic music apparatus (i.e., music reproduction apparatus) EM is not necessarily limited to the type where the performance operation section 11, the music piece data reproduction and audio signal generation section 12 etc. are provided within a single apparatus body, and may be of a type where the performance operation section 11, the music piece data reproduction and audio signal generation section 12 etc. are constructed as separate modules that are interconnected via a MIDI interface and a network communication interface, such as a LAN.

Electronic Music Apparatus (Music Reproduction Apparatus) EM

Figure 2:
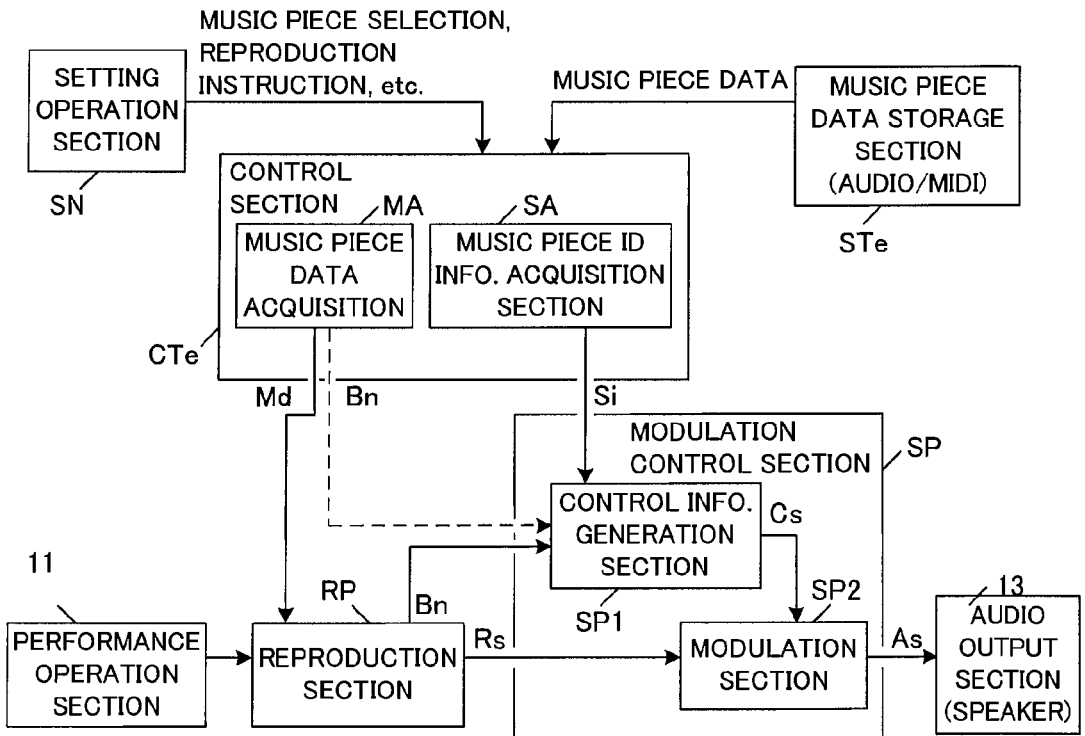
FIG. 2 is a functional block diagram of an electronic music apparatus in the embodiment of the present invention.

In the instant embodiment of the music content display system, the electronic music apparatus EM has not only the function of the electronic musical instrument but also the function of the music reproduction apparatus for reproducing desired reproducing music data (music piece data), such as MIDI data and audio data, as noted above. The electronic music apparatus EM as the music reproduction apparatus has not only a music piece reproduction function for time-serially reproducing desired reproducing music data (music piece data), such as MIDI data and audio data, but also a function for generating and outputting displaying control information (i.e., control information intended for displaying), associated with a currently reproduced music piece, as an audio signal (e.g., spatially sounding the audio signal as sound waves). Such an audio signal is received by the music content display apparatus (information processing apparatus) DS, where the displaying control information is extracted from the audio signal. Then, the music content display apparatus (information processing apparatus) DS prepares and displays given music displaying content (i.e., displaying music-piece-associated data, such as musical score data and music-piece guiding illustration data, namely, displaying content) in accordance with the extracted displaying control information. FIG. 2 is a functional block diagram of the electronic music apparatus EM in the instant embodiment of the present invention. A music piece data storage section STe is built in the storage device of the electronic music apparatus EM, and a multiplicity of sets of reproducing music data (music piece data), such as MIDI data and audio data, are prestored in the music piece data storage section STe as sets of usable music piece data. Each of such music piece data sets contains, in addition to music piece data Md as substantive data, music piece information identifying the music piece corresponding to the music piece data Md. The music piece information includes reference information, such as a music piece name and performer's name, and music piece ID information Si. The music piece ID information Si is unique information identifying the music piece data in question, which is also called music piece ID, ID information or music piece number and which functions also as "displaying content identification information" identifying displaying content to be used for displaying (i.e., displaying music-piece-associated data).

Note that the displaying content (i.e., displaying music-piece-associated data) may include music piece ID information Si as additional information, and/or a table or program defining correspondency between various sets of displaying content (i.e., displaying music-piece-associated data) and music piece ID information Si may be prestored in the music content display apparatus DS. Further, music piece ID information Si may be converted in advance, by means of a table or the like, in the electronic music apparatus EM into content identification information for use in the music content display apparatus DS, so that a particular item or set of displaying content (i.e., displaying music-piece-associated data) can be identified directly from the converted content identification information.

The electronic music apparatus EM includes, as functional blocks additional to the aforementioned music piece data storage section STe, a setting operation section SN, a control section CTe, a reproduction section RP and a modulation control section SP. The setting operation section SN has various switches and operators, such as music piece selection switches, a music piece reproduction switch and a control button for switching between ON and OFF states of control signal output, and it detects user's music piece selection and reproduction instructions given by such switch operations and setting operations, such as a control signal output ON/OFF setting operation, and then supplies the detected results to the control section CTe. The control section CTe, which is a functional block implemented mainly by a CPU, includes a music piece data acquisition section MA and a music piece ID acquisition section SA. The music piece data acquisition section MA reads out music piece data corresponding to a music piece designated through a user's music piece selection operation detected by the setting operation section SN and outputs the music piece data (MIDI data, audio data, etc.) Md, contained in the read-out music piece data, to the reproduction section RP. Further, the music piece ID acquisition section SA acquires the music piece ID information Si from the read-out music piece data and outputs the acquired music piece ID information Si to the modulation control section SP.

The reproduction section RP and the modulation control section SP are functional blocks implemented mainly by the music piece data reproduction and audio signal generation section 12. The reproduction section RP has a function for automatically reproducing music piece data Md (automatic reproduction or performance function) and a tone generation function. Namely, once music piece reproduction is instructed by turning-on of the music piece reproduction switch of the setting operation section SN, the reproduction section RP automatically reproduces time-serially the music piece data Md from the music piece data acquisition section MA within the control section CTe and generates tone signals corresponding to the read-out music piece data. Such a music piece data reproduction process may be performed by use of a construction conventionally known in the field of MIDI sequencers or the like. Note that the music piece data Md may comprise wave data compressed by the MP3 compression technique or the like rather than being limited to event information like MIDI data, in which case the music piece data reproduction process may comprise decoding the compressed wave data into PCM-modified tone signals and reproducing the PCM-modified tone signals. Also, in response to a performance operation being performed by the user on the performance operation section 11, the reproduction section RP generates tone signals corresponding to performance data Pd based on the performance operation. The thus-generated tone signals Rs are each supplied to the modulation control section SP. If the user executes a perform operation on the performance operation section 11 in response to reproduction of the music piece data Md, both tone signals based on the reproduction of the music piece data Md and tone signals based on the performance data Pd are generated. If only the music piece data Md are reproduced, only tone signals based on the reproduction of the music piece data Md are generated. Further, if, on the other hand, the user executes a performance operation on the performance operation section 11 without the music piece data Md being reproduced, then only tone signals based on the performance data Pd are generated. Further, when the music piece data Md are being reproduced, the reproduction section RP generates reproduced position information Bn each indicative of a current reproduced position in accordance with a progression of the reproduction of the music piece and outputs the thus-generated reproduced position information Bn to the modulation control section SP. The reproduced position information Bn may be indicative of any desired range on the musical score, such as a measure number (also referred to as a measure position) indicative of a measure number of a measure where a currently reproduced tone (note) is located or a page number of a page where a currently reproduced tone (note) is located. In the following example, the measure number is used, or indicated, as the reproduced position information Bn.

As depicted by broken line in FIG. 2, the reproduced position information Bn may be generated directly by the control section CTe or acquired from the music piece data Md so that it is output to the modulation control section SP, as the music piece data Md are read out by the reproduction section RP. For example, where the music piece data Md include timing data like master track information, the timing data may be read out directly as the reproduced position information Bn in synchronism with the readout of the music piece data Md.

The modulation control section SP includes a control information generation section SP1 and a modulation section SP2. The modulation control section SP is activated once a "score page turning" function is turned on in response to the user turning on a score page turning control button (score page turning selector) in the setting operation section SN, so that the modulation control section SP generates control information Cs called "score page turning signal" at predetermined time intervals (e.g., every 0.5 seconds). Further, once the "score page turning" function is turned off in response to the user turning off the score page turning control button, the control information generation section SP1 is deactivated so that the control information (score page turning signal) Cs is no longer generated.

Figure 3:
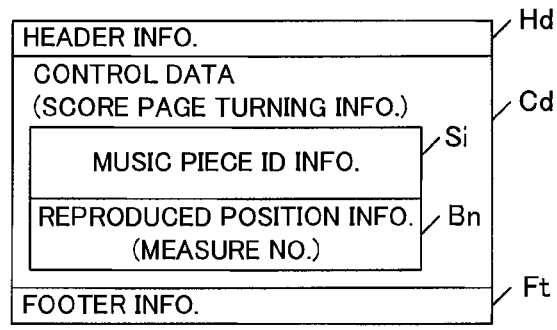
FIG. 3 is a diagram showing an example format of control information in the embodiment of the present invention.

As shown in FIG. 3, the control information Cs includes control data (called "score page turning signal information") Cd including, as substantive data, music piece ID information Si and reproduced position information (measure position) Bn, and the displaying content display on the music content display apparatus DS can be controlled with the control data Cd. According to an example format of FIG. 3, the control information Cs includes header information Hd of about one byte, control data Cd of about two bytes and footer information Ft of about one byte. The header information Hd includes information indicating that the signal in question is control information ("score page turning signal") Cs, information capable of identifying a length of the control data Cd, etc. The control data Cd includes music piece ID information Si of about eight bits and reproduced position information Bn of about eight bits, and the footer information Ft includes information indicative of the end of the control data Cd and the like.

In such a manner that the audio signal of a predetermined frequency band carries the control information Cs that is digital data output from the control information generation section SP1, the modulation section SP2 modulates the audio signal with the control information Cs and superimposes (mixes) the modulated audio signal on (with) a tone signal supplied from the reproduction section RP, and then, the modulation section SP2 outputs, to the audio output section 13, a sound signal As having the tone signal and the audio signal, modulated with the control information Cs, superimposed thereon (or mixed therewith). Using, for example, the direct sequence spread spectrum technique, the modulation section SP2, the modulation section SP2 performs a modulation process for including the control information (which is a digital signal) in the audio signal functioning as a carrier signal. A specific example of the modulation section SP2 will be described later with reference to FIG. 11. The audio output section 13 spatially sounds the sound signal As as sound waves through a speaker. The audio signal that functions as a carrier signal for transmitting the control information Cs is a signal of a high frequency band of, for example, about 18 kHz, so that data can be transmitted using a high frequency band of about 18 kHz that is within an audio frequency range reproducible via an ordinary speaker but hardly audible to the human ear (particularly, to the ear of adults). In this case, although the data transmission speed is not so high with a maximum of about 80 bps, there are achievable advantageous benefits that data of displaying control information can be transmitted to a location more than ten meters away and can be simultaneously distributed to a plurality of recipients (i.e., in a "one-to-many distribution" fashion), existing speaker equipment can be used and a transmission range can be controlled through sound volume adjustment of the speaker. Note that the audio signal functioning as a carrier signal for transmitting the control information Cs is not necessarily limited to the frequency band of about 18 kHz and may be of another frequency band normally hardly audible to the human ear so that the audio signal never prevents a user from clearly listening to musical sounds based on the tone signals generated by the reproduction section RP. Alternatively, the audio signal functioning as the carrier signal may be of another frequency band audible to the human ear.

Note that a sound signal As that does not contain an audio signal for carrying control information Cs (such as a signal of an ordinary performance sound) may sometimes be output. For example, when the score page turning control button provided in the setting operation section SN is OFF, no control information Cs is generated from the control information generation section SP1, no audio signal is generated either, and hence, no modulation is performed. In this case, the sound signal As comprises only a tone signal generated from the reproduction section RP.

When the score page turning control button provided in the setting operation section SN is ON, on the other hand, control information Cs is generated from the control information generation section SP1 at predetermined time intervals (e.g., every 0.5 seconds), so that an audio signal is constantly generated and modulated and the thus-modulated audio signal is constantly output. In this case, even when the current reproduced position has not changed, control information Cs including reproduced position information Bn indicative of the same reproduced position is repetitively generated at the predetermined time intervals, in response to which modulation of the audio signal is updated at the predetermined time intervals. Namely, if no tone signal is outputted from the reproduction section RP, i.e., a case where neither reproduction of a music piece nor a performance by a user is carried out, the sound signal As comprises only the audio signal for carrying control information Cs.

The first reason why selection/setting as to whether or not the audio signal for transmitting the control information Cs should be generated, although such an audio signal is of a high frequency band, normally not audible to the human ear, within the audio frequency range, is that high-band signals in the frequency band of about 18 kHz may be heard depending on a user's age (particularly, child of low age). If such an audio signal is generated even where the user does not require automatic score page turning control, the audio signal mixed in a tone signal would be undesirably heard and become extremely disagreeable to the user's ear. Therefore, the instant embodiment is constructed such that, in the case where the automatic score page turning control is not required, it does not generate the audio signal for transmitting the control information. The second reason is that, in a case where a plurality of the electronic music apparatus (music reproduction apparatus) EM are provided in the music content display system, the automatic score page turning control cannot be performed appropriately due to signal interference if audio signals are output from two or more of the electronic music apparatus (music reproduction apparatus) EM; in such a case, it is appropriate to turn on the displaying audio signal generation function of only one of the electronic music apparatus EM with the displaying audio signal generation function of the other electronic music apparatus EM kept turned off. The third reason is that the user would face an inconvenience if the automatic score page turning control is performed although the user does not want the automatic score page turning control to be performed for some reason (e.g., because the user wants to perform with only a particular page of the musical score kept opened).

Although the modulation section SP2 may employ any desired modulation scheme for transmitting the digital control information with the audio signal of a predetermined frequency band, it is preferable that the modulation scheme SP2 employ a modulation scheme that can make it difficult for a transmitted signal component to be heard by a person as noted above. For example, for such a purpose, spread codes (PN codes) of the M sequence, Gold sequence or the like may be superimposed on a high frequency band within the audio frequency range with such a faint level that can prevent an uncomfortable auditory feeling from being given to the user. FIG. 11 shows an example construction of the modulation section SP2, which, as shown, includes an LPF 20, an adder 21, a spread code generation section 22, a multiplier 23, an XOR circuit 24, a delay element 25, an LPF 26, a multiplier 27 and a carrier signal generator 28.

The spread code generation section 22 periodically generates a spread code of the M sequence or the like having a predetermined cyclic period. The spread code (one-bit serial data), generated by the spread code generation section 22, and the control information Cs (serial bit data coded in binary value of −1 or 1), generated and output by the generation section SP1, are multiplied together by the multiplier 23. In this way, the spread code is phase-modulated. Namely, if the bit data of the control information Cs is "1", the spread code is maintained in a current phase (i.e., left unconverted in phase), while the bit data of the control information Cs is "−1", the spread code is inverted in phase.

The spread code having been subjected to the phase modulation as above is supplied to the XOR circuit 24. The XOR circuit 24 outputs a result of exclusive ORing between a current code input thereto from the multiplier 23 and a last code input thereto via the delay element 25 (i.e., code having been delayed by one sample via the delay element 25) (i.e., differentially codes the current and last codes). Let it be assumed that a signal having been subjected to such differential coding is binarized into −1 or 1. By the binarized differential code being output from the XOR circuit 24, a decoding end can extract the spread code before the differential coding by multiplying two successive samples of the differential codes.

Then, the differentially-coded spread code is limited in frequency band within a baseband by the LPF 26, and the resultant band-limited spread code is input to the multiplier 27. The multiplier 27 multiplies together a carrier signal (i.e., audio signal of a predetermined high frequency band within the audio frequency range) and an output signal of the LPF 26 to thereby shift (frequency-shift) the differentially-coded spread code to a predetermined passband. Note that the differentially-coded spread code may be frequency-shifted after being subjected to "upsampling". The frequency-shifted spread code (i.e., audio signal modulated with the control information Cs) is added (mixed), via the adder 21, with a tone signal generated by the reproduction section RP. However, before the addition, the tone signal is limited, via the LPF 20, to a frequency band different from frequency components of the spread code. In this manner, the displaying control information is modulated into the audio signal of the high frequency band within the audio frequency range and then superimposed onto the tone signal.

It should be appreciated that the music reproduction apparatus of the present invention may be any other type of equipment or apparatus than an electronic musical instrument, such as a karaoke apparatus, a personal computer, a portable communication terminal like a portable phone or a game apparatus, as long as it is constructed to be capable of audibly generating a tone through a speaker or the like in response to reproduction of music piece data. Further, in the case where the music reproduction apparatus of the present invention is a portable communication terminal, the predetermined music piece reproduction function need not necessarily be possessed and performed by the portable communication terminal alone, and a part of the music piece reproduction function may be possessed and performed by a server in such a manner that the predetermined music piece reproduction function can be implemented as a whole by a system comprising the portable communication terminal and the server.

Figure 4:
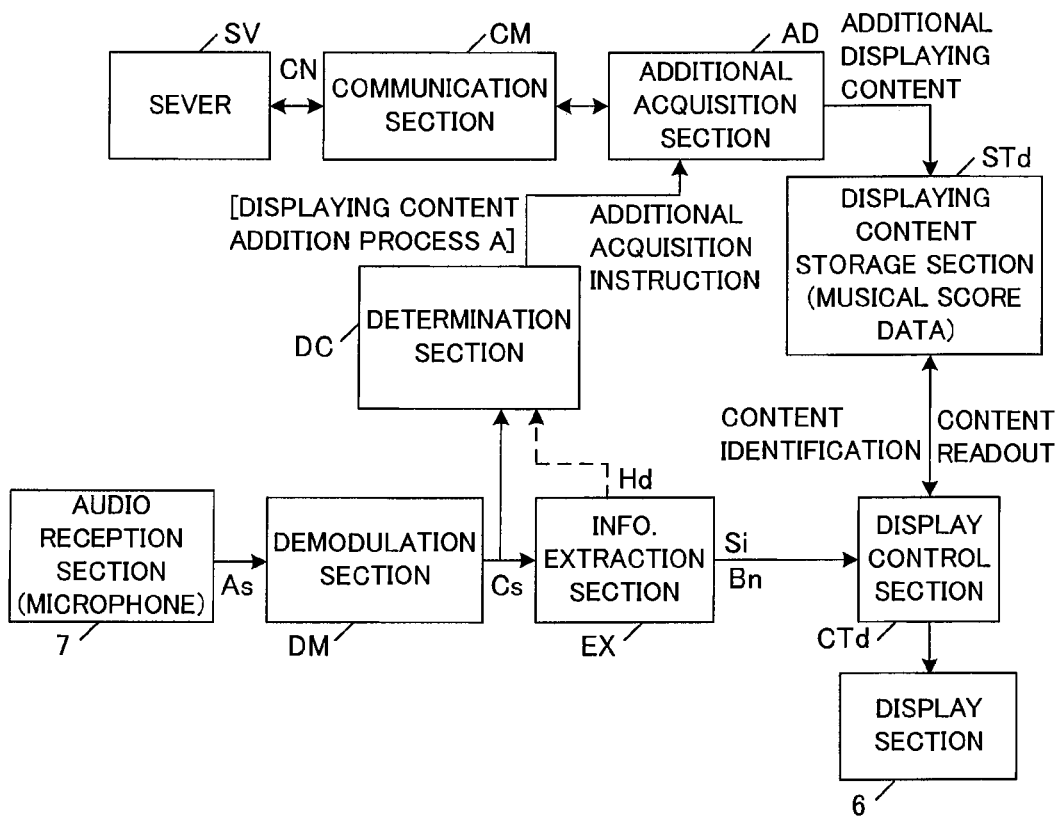
FIG. 4 is a block diagram showing a first function of a music content display apparatus in the embodiment of the present invention.
Figure 5:
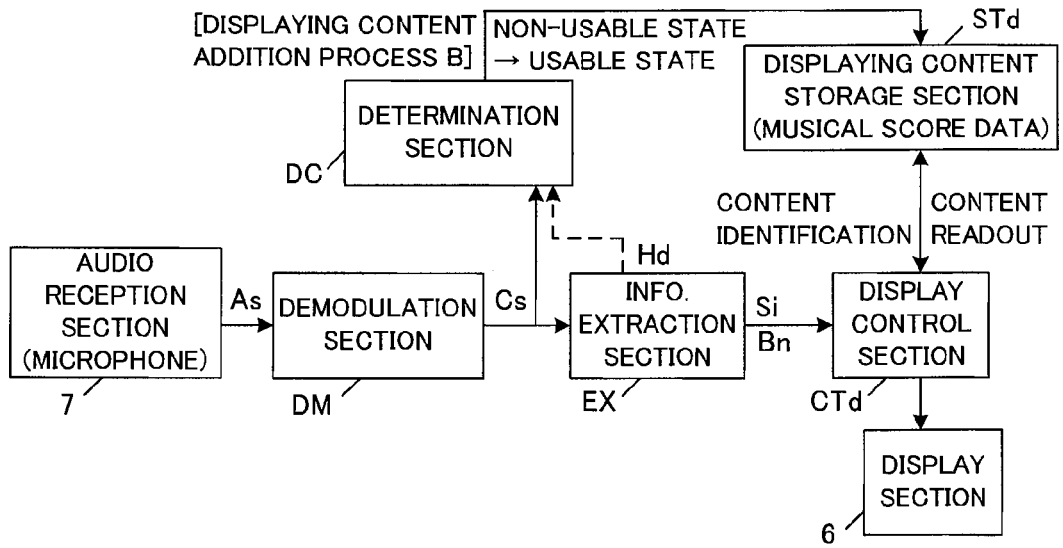
FIG. 5 is a block diagram showing a second function of the music content display apparatus in the embodiment of the present invention.

Display Function of the Music Content Display Apparatus (Information Processing Apparatus) DS In the embodiment of the music content display system of the present invention, the music content display apparatus (information processing apparatus) DS has a function for receiving a control signal from the electronic music apparatus (music reproduction apparatus) and preparing and displaying given displaying content (displaying music-piece-associated data). FIGS. 4 and 5 are block diagrams showing first and second functions of the music content display apparatus in the embodiment of the present invention.

A plurality of items or sets of displaying content associated with individual music pieces (i.e., music-piece-associated data to be displayed as displaying content) are stored in the displaying content storage section STd built or provided in the storage device 4 of the music content display apparatus DS. As such displaying content may be used any desired displaying content created such that switching is made between images in correspondence with a progression of a music piece; examples of the displaying content include musical score data, and music piece guiding illustration data created such that switching is made between guiding illustrations generally in a "picture-card" fashion in correspondence with a progression of a music piece). The following describe a case where an item or set of displaying content is a set of musical score data or a musical score data set. In the illustrated example, any desired portion (such as a page or display block) within a set of displaying content (musical score data) can be read out and displayed on a display screen in response to reproduced position information Bn and the like.

Each of the displaying content (musical score data set) contains, in addition to musical score data that are substantive data, music piece information identifying the music piece in question, such as reference information like the name (title) of the music piece, the name of a composer and the like, and content (musical score) identification information unique to the displaying content. The content identification information is associated with music piece ID information (music content identification information) Si included in control information Cs given from the electronic music apparatus EM. Further, each usable displaying content (musical score data set) prestored in the displaying content storage section STd corresponds to any one of items or sets of usable displaying content (musical score data) preset (prepared in advance) or built-in in the electronic music apparatus EM. For each of the sets of displaying content (musical score data set) stored in the displaying content storage section STd, the storage section STd has stored therein, as stored information, records of the music piece name (title), content identification information, corresponding music piece ID (Si) (that is unnecessary in a case where a correspondency table or program is prepared in advance) and records of usability/non-usability. A list of music piece names (titles) (with which respective music piece IDs may be associated) of sets of currently stored usable displaying content (musical score data) can be displayed in response to user's operation of a table-of-contents button.

Further, the music content display apparatus DS includes a demodulation section DM, a determination section DC, an information extraction section EX and a display control section CTd, and these functional blocks are implemented mainly by the CPU 1. The audio input section (reception section) 7 receives a sound signal As in the form of sound waves transmitted from a speaker of the electronic music apparatus (music reproduction apparatus) EM and inputs the received sound signal As to the demodulation section DM. Then, the demodulation section DM extracts a modulating component from the input sound signal As to thereby demodulate the extracted modulating component into control information Cs and outputs the demodulated control information Cs to the information extraction section EX and determination section DC. Details of the demodulation section DM will be described later with reference to FIG. 12. Note, however, that control information Cs is sometimes not contained, in which case no output is generated from the demodulation section DM. As noted previously, the control information Cs is also called "score page turning signal", which is a digital signal included in an audio signal transmitted in a high frequency band of about 18 kHz constantly (once every 0.5 seconds) and which is used to automatically sequentially switch a musical score display in a similar manner to actual manual page turning of the musical score.

Figures 13, 14:
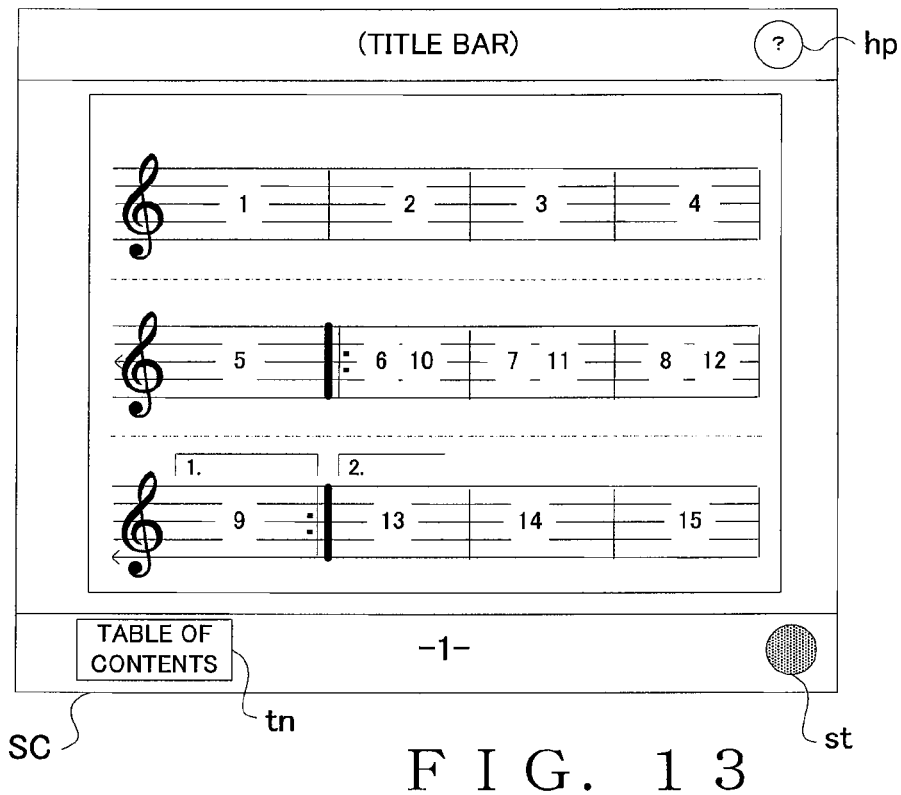
FIG. 13 is a diagram showing a specific example of a musical score displayed in a musical score display area shown in FIG. 6.
FIG. 14 is a conceptual diagram showing a data organization of a musical score display control table.

The information extraction section EX extracts control data Cd, i.e., music piece ID information Si and reproduced position information (measure number) Bn, from the control information Cs modulated by the demodulation section DM and then outputs the extracted control data Cd to the display control section CTd. The display control section CTd identifies an item or set of displaying content (musical score data) corresponding to the music piece ID information Si by referencing the musical score identification information associated with the music piece ID information Si, reads out the identified set of displaying content (musical score data) from the displaying content storage section STd, determines a musical score page of the displaying content (musical score data) to be displayed in correspondence with the reproduced position information (measure number) Bn, and then sends data of the determined musical score page to the display section 6. Then, the display section 6 displays, on the screen, the musical score page indicated by the data sent from the display control section CTd. As an example, the display control section CTd searches through a musical score display control table as shown in FIG. 14 to thereby identify a portion of the musical score to be displayed in correspondence with a current reproduced position. FIG. 14 will be discussed later.

The function of the information extraction section EX may be included in the function of the demodulation section DM so that the music piece ID information Si and reproduced position information Bn can be extracted from the control information Cs within the demodulation section DM. Alternatively, the function of the information extraction section EX may be included in the function of the display control section CTd so that the music piece ID information Si and reproduced position information Bn can be extracted from the control information Cs within the display control section CTd.

FIG. 12 is a block diagram showing an example construction of the demodulation section DM, which is suited to demodulate the control information Cs from the audio signal modulated with the modulation section SP2 shown in FIG. 11. The demodulation section DM includes an HPF 31, a delay section 32, a multiplier 33, an LPF 34, a correlator 35, a peak detection section 36 and a code determination section 37. A sound signal picked up by the audio input section (microphone) 7 is input to the HPF 31 that is a filter for extracting the audio signal of the predetermined frequency band superimposed on the sound signal. An output signal from the HPF 31 is input to the delay section 32 and the multiplier 33.

A delay amount of the delay section 32 is set at a time equal to one chip of the differential code. In the case where the differential code has been subjected to upsampling, the delay amount of the delay section 32 is set at a time equal to one chip of the differential code having been subjected to the upsampling. The multiplier 33 multiplies together the current sample of one chip input from the HPF 31 and the last sample (that is one chip before the current sample) input from the delay section 32 and performs a delay detection process. Through the delay detection process, the spread code before the differential coding can be extracted.

An output signal from the multiplier 33 is extracted as a baseband signal via the LPF 34 and then input to the correlator 35. The correlator 35 comprises an FIR filter (matched filter) having set therein a spread code generated by the spread code generation section 22 as a filter coefficient, and it obtains a correlation value between the input audio signal and the spread code. Because the spread code used here is a code of the M sequence, Gold sequence or the like having high autocorrelation, positive and negative peak components of the correlation value output from the correlator 35 are extracted by the peak detection section 36 with the cyclic period of the spread code (data code). The code determination section 37 decodes each of the peak components as a data code of the control information Cs (i.e., decodes the positive peak as "1" and the negative peak as "0").

Figure 6:
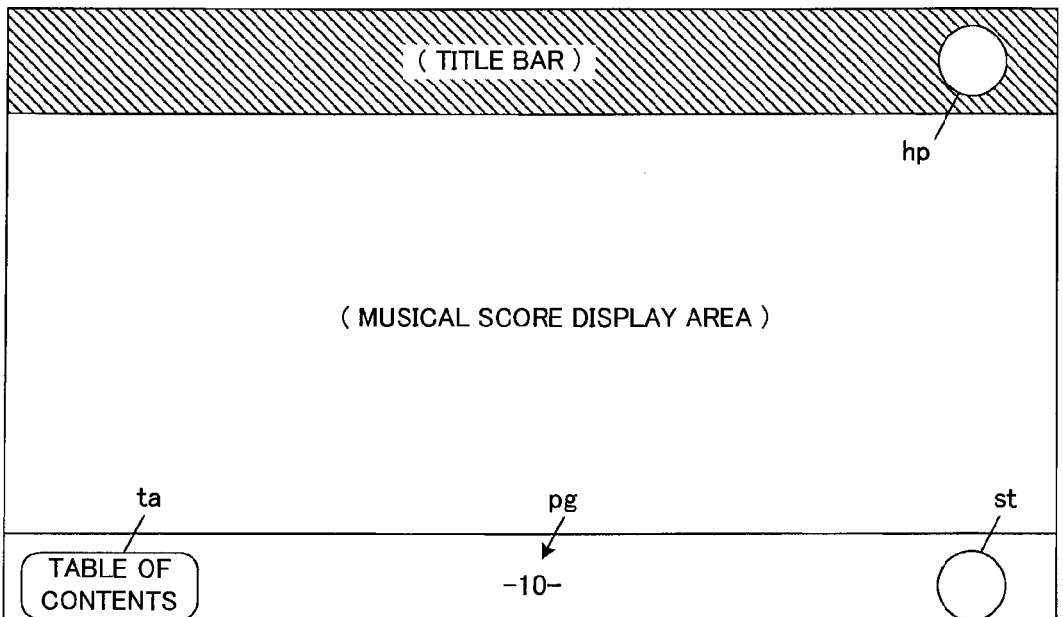
FIG. 6 is a diagram showing an example of a display screen in the embodiment of the present invention.

FIG. 6 shows an example of a display screen SC of the display section 6 in the embodiment of the present invention, and this display screen SC is in the form of a touch panel. The display screen SC has the following display function. On the display screen SC, a music piece name (title) etc. are displayed in a belt-shaped title bar display area located in an upper portion of the screen, and a help button hp is displayed in the title bar display area near the right end thereof. Further, a main display area located centrally on the screen is allocated as a musical score display area where a given musical score is displayed based on musical score data. Furthermore, a page number pg ("10" in the illustrated example of FIG. 6) of a musical score being currently displayed in the musical score display area is displayed centrally in a lower portion of the screen, and a table-of-contents button to is displayed in the lower portion of the screen near the left end thereof while a score page turning signal lamp st is displayed in the lower portion of the screen near the right end thereof. Each time the control information (score page turning signal) Cs is received, the score page turning signal lamp st is illuminated to indicate a reception state of the control information (score page turning signal) Cs. In response to a user's touching operation on the help button hp, help information, version information, etc. are displayed in a part or whole of the main display area. In response to a user's touching operation on the table-of-contents button ta, a list of usable displaying content (i.e., a list of music piece names or titles) stored in the displaying content storage section STd is displayed in the main display area.

Further, in response to a user's touching operation for selectively designating a desired music piece from the list of usable displaying content, a shift is made to a table-of-contents mode, so that a musical score corresponding to the designated music piece is displayed. In the table-of-contents mode, although not particularly shown, score page turning can be performed in response to a predetermined touching operation on the display screen; for example, a next page of the musical score (i.e., musical score portion of the next page) is displayed in response to a user's touching operation on a portion located to the right of the page number pg, or a preceding page of the musical score (i.e., musical score portion of the preceding page) is displayed in response to a user's touching operation on a portion located to the left of the page number pg. Thus, in the table-of-contents mode, the user can cause the musical score to be displayed on the display screen SC of the music content display apparatus DS and can perform the music piece through a performance operation via the performance operation section 11 of the predetermined electronic music apparatus EM while viewing the displayed musical score, irrespective of a reproduction state of the music piece data (reproducing music piece data) in the electronic music apparatus EM.

FIG. 13 shows a specific example of a musical score displayed in the musical score display area shown in FIG. 6. As shown in FIG. 13, a plurality of rows, each having a plurality of measures, of a musical score is displayed in the musical score display area; that is, the musical score is displayed in a plurality of rows each having a plurality of measures. In the illustrated example, three rows, each having a musical score portion of four measures, are displayed in the musical score display area, and thus, a musical score having a total of twelve measures is formed as one page of image data. Per music piece, a plurality of pages of such image data corresponding to a musical score of the music piece (these pages will hereinafter be collectively referred to as a musical score data set) are stored in the storage section STd. In the instant embodiment, items or sets of displaying content (musical score data) of all music pieces preset (or prepared in advance) or built-in in the electronic music apparatus (i.e., music reproduction apparatus) EM are not prestored in the storage section STd of the music content display apparatus DS in an initial state. Desired content can be automatically additionally stored into the storage section STd as will be described later.

The following describe the musical score display control table shown in FIG. 14 and display control performed by the display control section CTd (FIGS. 4 and 5) using the musical score display control table. FIG. 14 is a conceptual diagram showing a data organization of the musical score display control table for a single music piece, and such a musical score display control table is provided per music piece. The illustrated example of FIG. 14 assumes a case where the display control section CTd performs the display control when displaying a musical score of a music piece, including a repeat performance, in three divided rows.

In the musical score display control table shown in FIG. 14, an object page to be displayed in each row of the musical score on the display screen is defined per measure (more specifically, measure number defined by reproduced position information Bn included in control information Cs sent form the music reproduction apparatus EM) of a tone being currently reproduced. For example, page "1" (i.e., first page) is defined for all of first to third rows as for measure number "1" to measure number "4", and thus, display control for displaying the first to third rows of page "1" is performed during reproduction of tones of the first to fourth measures. Further, as for measure number "5", page "2" (second page) is defined for the first row and page "1" is defined for the second and third rows, so that display control is performed such that, once a shift is made to reproduction of tones of the fifth measure, only a musical score portion of the first row where the first row of page "1" has been displayed is switched to a display of the first row of page "2". Thus, the musical score displayed on the display screen SC switches to a display style where the first row of page "2" and the second and third rows of page "1" are displayed in a mixed fashion. As for measure number "6" to measure number "12", the definition is the same as for measure number "5", and thus, display control is performed for displaying the first row of page "2" and the second and third rows of page "1" during reproduction of tones of the sixth to twelfth measures.

Further, as for measure number "13", page "2" (second page) is defined for the first row and second rows and page "1" is defined for the third row, so that display control is performed such that, once a shift is made to reproduction of tones of the thirteenth measure, a musical score portion of the second row where the second row of page "1" has been displayed is switched to a display of the second row of page "2". Further, as for measure number "16", page "2" is defined for all of the first to third rows, so that display control is performed such that, once a shift is made to reproduction of tones of the sixteenth measure, a musical score portion of page "2" is displayed in all of the first to third rows. Namely, the musical score displayed on the display screen SC switches from the display style where page "2" and "page 1" are displayed in a mixed fashion to a display style where only page "2" is displayed. In this manner, score page turning control is performed sequentially from the uppermost row in accordance with object pages to be displayed for individual rows based on measure numbers defined in the musical score display control table. In other words, in the musical score display control table, settings are made such that, once a performance (reproduction) proceeds to a measure of a next row after a performance (reproduction) of all the measures included in a given row have been completed, the given row for which the performance has just been completed is updated with a musical score portion of the next page. In this way, reproduced positions of tones to be reproduced after a reproduced position of a current tone can be displayed prior to the reproduction of the tones to be reproduced.

Musical Score Display Control

Figure 7:
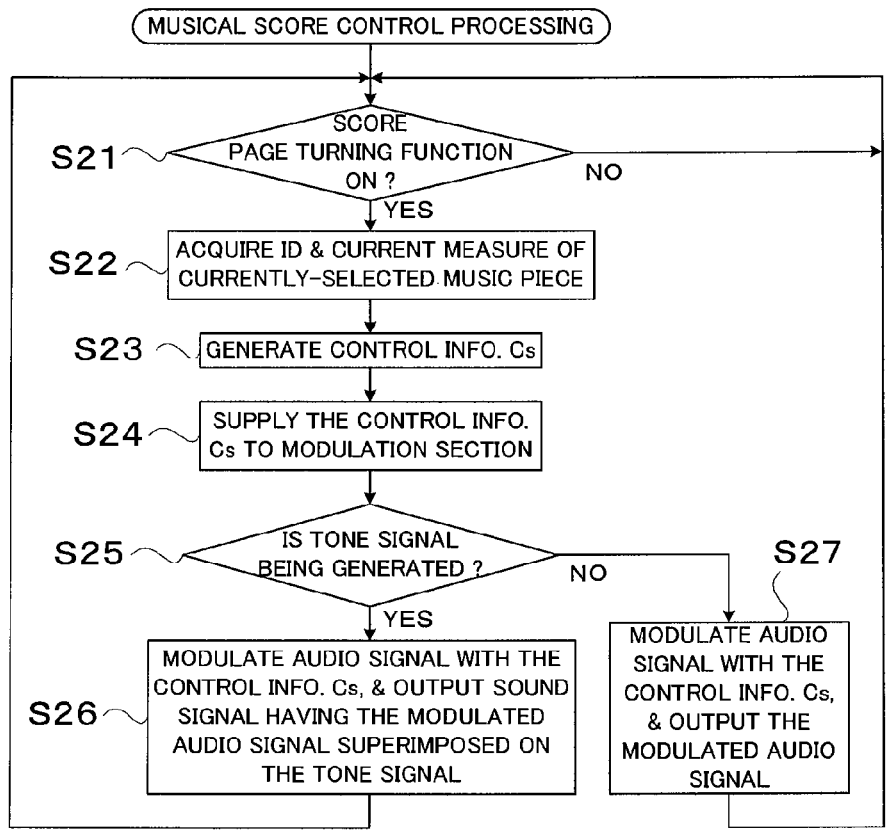
FIG. 7 is a flow chart showing an example of musical score control processing in the embodiment of the present invention.
Figure 8:
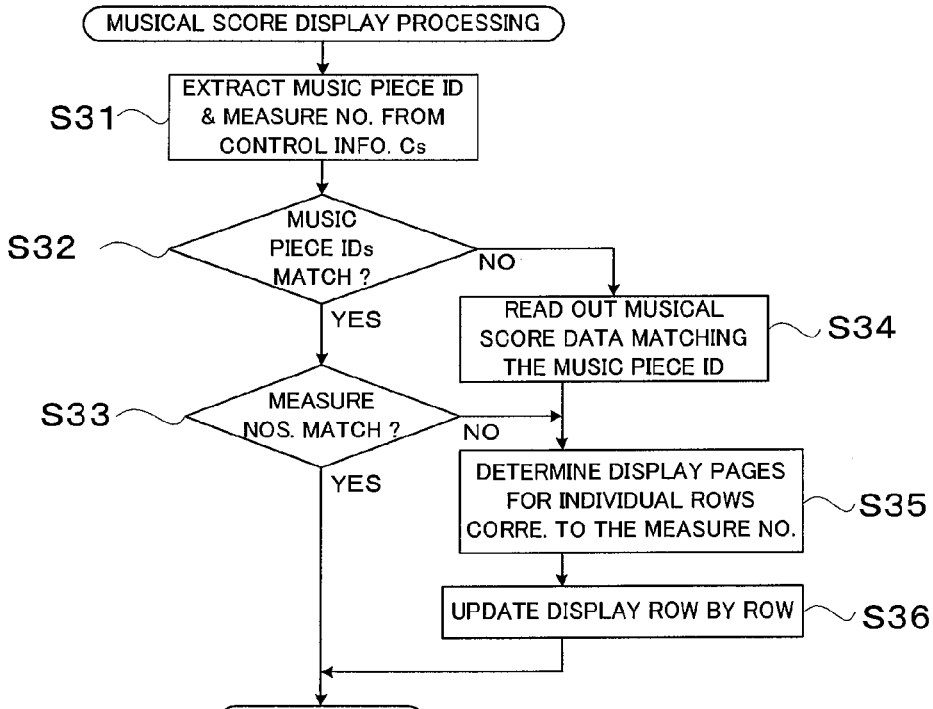
FIG. 8 is a flow chart showing an example of musical score display processing in the embodiment of the present invention.

The following describe, with reference to FIGS. 7 and 8, various control programs for implementing a musical score control function of the electronic music apparatus (i.e., music reproduction apparatus) EM and a musical score display function of the music content display apparatus (information processing apparatus) DS. FIG. 7 is a flow chart showing an example of musical score control processing for implementing the musical score control function of the electronic music apparatus (i.e., music reproduction apparatus) EM. The musical score control processing is controlled by the CPU of the electronic music apparatus (i.e., music reproduction apparatus) EM, and this process is started up in response to powering-on of the electronic music apparatus (i.e., music reproduction apparatus) EM.

First, at step S21, a determination is made as to whether a score page turning function has been set ON in response to a user's operation of a switching button or the like. If the score page turning function has not yet been set ON as determined at step S21 (NO determination at step S21), the musical score control processing waits until the score page turning function is set ON. If, on the other hand, the score page turning function has been set ON (YES determination at step S21), the CPU goes to step S22. At step S22, if a music piece data set has been selected previously by the user, the music piece ID is acquired from the music piece information of the user-selected music piece data set, or if a music piece data set has not been selected previously by the user, an initially-set music piece data is automatically selected and then music piece ID is acquired from the music piece information of the automatically-selected music piece data. Also, at step S22, a measure number (reproduced position information Bn) corresponding to a current reproduced position of the selected music piece data set is acquired. If reproduction of the selected music piece data set has not yet been started, a measure number of a reproduced start position (e.g., measure number "1" of the first measure) acquired. Note, however, that, if the user is allowed to designate a desired reproduction start position of the selected music piece data set, then a measure number corresponding to the user-designated reproduction start position is acquired.

Then, control information Cs (see FIG. 3) including the acquired music piece ID (music piece information) and measure number (reproduced position information Bn) is generated at step S23. At next step S24, the control information Cs generated at step S23 is supplied to the modulation section SP2. At step S25, a determination is made as to whether a tone signal is being generated. If a tone reproduction start instruction has not been given and thus the music piece data is not being reproduced, and if the performance operator is not being operated by the user, then it is determined, at step S25, that no tone signal is being generated (NO determination at step S25), control is performed, at step S27, for modulating an audio signal with the control information Cs and outputting only the thus-modulated audio signal via the audio output section 13. Then, the CPU reverts to the operation of step S21.

If, on the other hand, it is determined, at step S25, that a tone signal is being generated, i.e., if a tone signal is being generated by the reproduction section RP on the basis of reproduction of the music piece data and/or a tone signal is being generated by the reproduction section RP in response to a user's operation of the performance operator (YES determination at step S25), an audio signal is modulated with the control information Cs, so that a sound signal having the modulated audio signal superimposed on the generated tone signal is output to the audio output section 13 (step S26). Then, the CPU reverts to the operation of step S21.

The aforementioned operations of steps S21 to S27 are performed repetitively at predetermined time intervals (e.g., every 0.5 seconds), the audio signal containing the control information Cs is either sounded superimposed on the tone signal or sounded alone at predetermined time intervals. Thus, when reproduction of music piece data has not yet progressed (i.e., when a reproduction start instruction has not been given although a music piece to be reproduced has been selected, or when progression of reproduction has temporarily stopped although reproduction has been started), same display information with the same measure number (i.e., with the measure number left unchanged) is sounded through the speaker at predetermined time intervals, so that a musical score currently displayed of the display screen SC of the information processing apparatus is maintained in a current display state without being subjected to the score page turning control. When reproduction of music piece data has progressed, on the other hand, display control information with the measure number varying as the tone reproduced position progresses is sounded through the speaker, in response to which a musical score displayed of the display screen SC of the information processing apparatus is subjected to the score page turning control.

FIG. 8 is a flow chart showing an example of musical score display processing for implementing the musical score display function of the music content display apparatus (information processing apparatus) DS. The musical score display processing is controlled by the CPU 1 of the music content display apparatus (i.e., information processing apparatus) DS and this process is started up in response to receipt of the sound signal As comprising the audio signal carrying control information Cs. As an example, the CPU 1, which is repetitively performing a process for implementing the function of the aforementioned demodulation section DM (program process equivalent to the construction shown in FIG. 12), may start up this musical score display processing when one set of control information Cs can be extracted in the process.

First, at step S31, a music piece ID and measure number are extracted from the control information Cs carried via the audio signal within the sound signal As having been sounded by the electronic music apparatus (i.e., music reproduction apparatus) EM via the speaker. At step S32, a determination is made as to whether the extracted music piece ID matches the music piece ID currently stored in the RAM 2 (i.e., music piece ID of a music piece represented by a musical score currently displayed on the display screen SC). If the extracted music piece ID matches a music piece ID currently stored in the RAM 2 (YES determination at step S32), a further determination is made, at step S33, as to whether the extracted measure number matches a measure number currently stored in the RAM 2. If the extracted measure number matches the measure number currently stored in the RAM 2 (YES determination at step S33), the instant musical score display processing is brought to an end. Namely, in this case, there is no need to change the displayed position of the musical score, currently displayed on the display screen SC, in accordance with a progression of the reproduced position of the music piece, and thus, the score page turning control of the musical score is not performed. Further, because the music piece currently reproduced has not been changed to another music piece, there is no need to replace the musical score displayed on the display screen SC with another musical score. Note that, if the audio signal has been received by the music content display apparatus (i.e., information processing apparatus) DS for the first time, no measure number has been stored in the RAM 2, and thus, a NO determination (i.e., mismatch determination) is necessarily made at step S33.

If it has been determined, at step S32, that the extracted music piece ID does not match the music piece ID currently stored in the RAM 2 (NO determination at step S32), a musical score data set matching the extracted music piece ID is read out from the storage device (storage section STd) at step S34. Namely, if the music piece data selected as an object of reproduction has been changed to another, the musical score displayed on the display screen SC is replaced with a musical score of the changed music piece. Further, in this case, a display control table matching the extracted music piece ID (see FIG. 14) is identified. Further, the extracted music piece ID is written into the RAM 2 for storage therein as the currently-stored measure number. Namely, each time the measure number included in the display control information changes to another one, the measure number currently stored in the RAM 2 is updated. Following the operation of step S34, or if it has been determined, at step S33, that the extracted measure number does not match the measure number currently stored in the RAM 2 (NO determination at step S33), display pages for individual rows corresponding to the measure number extracted at step S31 are determined at step S35 with reference to the identified display control table. Further, in this case, the extracted measure number is written into the RAM 2 for storage therein. At next step S36, the score page turning control is performed for updating the musical score display, on a row-by-row basis, for each of the rows on the display screen SC on the basis of the determination of the display pages.

When no sound signal is being sounded from the music reproduction apparatus EM at the time of an execution instruction of the program in question, there may be presented on the display screen SC any desired initial display, such as one where a musical score of a music piece that was being displayed at the time of the last termination of the program is displayed again from the first measure, one where a musical score of a predetermined demonstration music piece is displayed from the first measure, or one where a blank musical score (i.e., only a staff) is displayed. Alternatively, a menu screen (not shown) rather than a musical score may be displayed as an initial display.

Although not shown in FIG. 7, once the user performs an operation for selecting a music piece on the electronic music apparatus EM, control information Cs different in music piece ID (and measure number) from before the music piece selection is newly generated through the operations of steps S22 and S23 following the music piece selection. Then, an audio signal including the newly generated control information Cs is sounded via the speaker through the aforementioned operations at and after step S24. In response to the execution of the process of FIG. 8, the music content display apparatus DS performs display control for changing the musical score portions of all of the plurality of rows, currently displayed on the display screen SC, to new musical score portions rather than performing score page turning control for changing the musical score portion of only a part of the plurality of rows.

In the electronic music apparatus (music reproduction apparatus) EM in the instant embodiment, as set forth above, an audio signal including control information Cs is sounded at relatively short predetermined time intervals (e.g., 0.5 seconds) irrespective of whether the music piece reproduction progression has arrived at timing for turning pages of a musical score. Namely, the electronic music apparatus (music reproduction apparatus) EM continues to periodically output information related to display control of the display device of the external information processing apparatus DS. The information processing apparatus DS, on the other hand, performs musical score display control on the basis of received control information Cs. More specifically, according to the musical score display control based on the control information Cs, a musical score is displayed on the display screen SC in a plurality of divided rows each including a plurality of measures, and score page turning control is performed sequentially on a row-by-row basis, i.e., musical score display update is sequentially on a row-by-row basis in such a manner that a display of a given one of the rows, for which reproduction of all of the measures has been completed, is deleted and another display is added for a new row in place of the deleted display; in this way, the display of the new row can be completed by the time reproduction of the measures included in the new row is started. With such arrangements, the information processing apparatus DS can display an appropriate musical score portion, even before the start of reproduction of tones, by acquiring displaying control information, and thus, the user does not have to take the trouble to manually call out a desired musical score portion or a musical score portion of a performance start position prior to the start of the performance.

Figure 9:
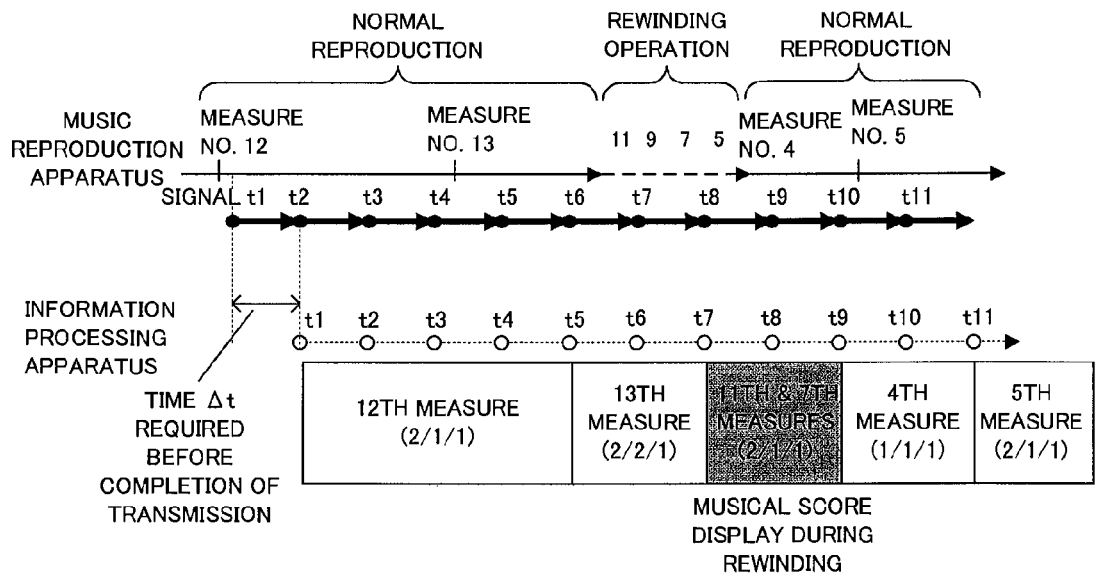
FIG. 9 is a time chart showing examples of various operation timing of the musical score control processing and the musical score display processing corresponding to styles of tone reproduction.

FIG. 9 is a time chart showing examples of various operation timing of the musical score control processing and the musical score display processing corresponding to various styles of tone reproduction. More specifically, FIG. 9 indicates, sequentially from top to bottom, a reproduced position (measure number) of a music piece currently reproduced in the music reproduction apparatus EM, generation timing at which the music reproduction apparatus EM generates an audio signal including control information Cs, reception completion timing at which the information processing apparatus DS completes receiving an audio signal including control information Cs, and a musical score position (measure number) displayed on the display screen SC by the information processing apparatus DS.

The music reproduction apparatus EM behaves as follows. At given timing or time point t1, the music reproduction apparatus EM generates and transmits an audio signal including control information Cs. Upon completion of the transmission of audio signal t1 (here, for convenience, reference characters t1, t2, . . . indicative of time points are attached to audio signals to distinguish among the audio signals including control information Cs generated at individual timing), the music reproduction apparatus EM generates and transmits an audio signal (information) at next time point t2. Assuming that a time $\Delta t$ (e.g., 0.5 seconds) is required for generating an audio signal including control information Cs and completing transmission of the audio signal, a transmission interval (transmission period) between audio signals including one set of control information Cs equals the time $\Delta t$. Namely, the music reproduction apparatus EM generates and transmits information one after another at intervals of the time $\Delta t$ (see t3-t11). Generation and transmission of such information is performed at intervals of the time $\Delta t$ irrespective of whether the music reproduction apparatus EM is currently performing normal reproduction, rewinding operation or fast forwarding operation.

On the other hand, the information processing apparatus DS behaves as follows. The information processing apparatus DS completes receiving an audio signal, including given control information Cs, the time $\Delta t$ after the generation timing, in the music reproduction apparatus EM, of the audio signal. For example, reception of signal t1 transmitted from the music reproduction apparatus EM during reproduction of tones of the twelfth measure is completed at time point (t1+$\Delta t$). Further, because the measure number included in signal t1 is "12", a musical score portion of page "2" is displayed in the first row and a musical score portion of page "1" is displayed in each of the second and third rows, according to the display control table of FIG. 14. Further, because the measure number included in signals t2 to t4 received after signal t1 is "12" that is the same as, or has not changed from, the measure number in respective preceding signals, display control for updating the musical score is not performed for these signals t2 to t4. Furthermore, because the measure number included in signal t5 is "13" that has changed from measure number "12", "page 2" is defined for the second row according to the display control table of FIG. 14, and thus, in this case, display control is performed for updating the musical score such that the musical score portion of page "2" is displayed in the first and second rows and the musical score portion of page "1" is displayed in the third row, i.e., where score page turning has been effected for the second row.

With the aforementioned arrangements, the display control is performed in the information processing apparatus DS the time $\Delta t$ after an audio signal including control information Cs is generated from the music reproduction apparatus EM, and thus, the instant embodiment does not require a time for analyzing performed positions as required in the prior art technique. As a result, the instant embodiment can achieve the advantageous benefit that. even when a tone reproduced position has moved or jumped to another position, discontinuous with that tone reproduced position, due to a fast forwarding or rewinding operation, a musical score portion of a pertinent range can be displayed promptly after completion of the fast forwarding or rewinding operation as contrasted to the prior art technique. For example, let it be assumed that a rewinding operation has been performed for the thirteenth to fourteenth measures after generation and transmission start of signal t6 in the illustrated example of FIG. 9. Let it be also assumed that signal t7 and signal t8 are generated and transmitted during the rewinding operation, a reproduced position of a tone corresponding to the rewinding operation is the eleventh measure in signal t7, and a reproduced position of a tone corresponding to the rewinding operation is the seventh measure in signal t8. Thus, because the measure number included in signal t7 received by the information processing apparatus DS is "11", page "2" is displayed again in the first row and page "1" is displayed again in the second and third rows, according to the display control table. Further, although the measure number included in signal t8 received by the information processing apparatus DS immediately after signal t7 is "7", no display control is performed for that measure number because the same page numbers as for measure number "11" are defined in the display control table, so that displays of musical score portions of page "2" and page "1" are maintained in the first and the second and third rows, respectively. Further, because the measure number included in signal t9, generated and transmitted upon resumption of normal reproduction immediately following completion of the rewinding operation to the fourth measure, is "4", the musical score portion of page "1" is displayed in all of the first to third rows, according to the display control table. Thus, with audio signal (information) t9 generated immediately following the completion of the rewinding operation, a musical score portion corresponding to measure number "4" immediately following the completion of the rewinding operation is displayed in the information processing apparatus DS at time (t9+Δt). Because the time Δt is a short time of about 0.5 seconds, a musical score portion corresponding to a performed position can be displayed immediately following the completion of the rewinding operation.

Further, by updating the display of the musical score on the row-by-row basis, the instant embodiment can minimize adverse influences that would occur when reception conditions, in the information processing apparatus DS, of sound signals audibly sounded by the music reproduction apparatus EM are bad. For example, if signals t3 to t5 could not be received appropriately by the information processing apparatus DS in the illustrated example of FIG. 9, a musical score portion of page "2" and a musical score portion of page "1", corresponding to measure number "12" included in signal t2 that could be received accurately by the information processing apparatus DS, continue to be displayed in the first row and the second and third rows, respectively, although, if these information (signals t3 to t5) could be received accurately, a musical score portion, having been subjected to score page turning control such that the second row is switched to page "2", should be displayed in response to completion of reception of signal t5. However, in the musical score display corresponding to measure number "12", a musical score portion corresponding to measure number "13" has already been displayed, as shown in FIG. 13. Therefore, even where signals t3 to t5 could not be received and thus a musical score portion corresponding to measure number "13" cannot be displayed promptly, the musical score portion corresponding to measure number "13" can be displayed at a time point when signal t6 can be received by the information processing apparatus DS. Therefore, the user can, for example, conduct, without any problem, a performance practice in accordance with reproduction of tones while viewing the musical score.

The score page turning signal lamp st is displayed on the display screen SC of the information processing apparatus DS as shown in FIGS. 6 and 13, and thus, an illumination state of the score page turning signal lamp st allows the user to know at an early stage, e.g., prior to the start of reproduction of a music piece, whether the information processing apparatus DS is currently in a state capable of appropriately receiving an audio signal (or sound signal) or in a state incapable of appropriately receiving an audio signal (or sound signal). Thus, when the information processing apparatus DS is in bad signal reception conditions, e.g., when there is an obstacle that hinders the music reproduction apparatus EM from sounding an audio signal or hinders the information processing apparatus DS from picking up a sound, the user can take necessary actions, e.g., removing the obstacle or moving the information processing apparatus DS to a location of good reception conditions, for improving the signal reception conditions.

Figure 10:
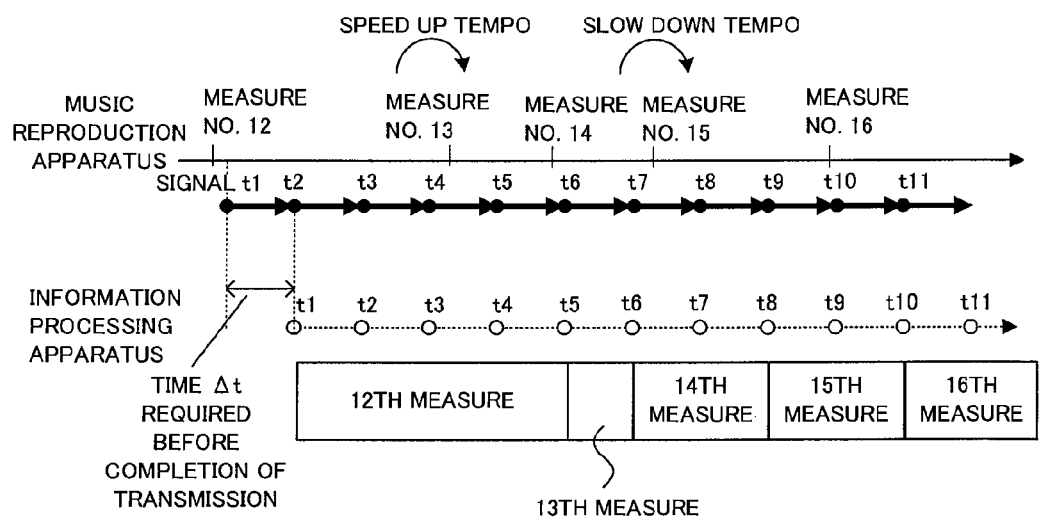
FIG. 10 is a time chart showing examples of various operation timing of the musical score control processing and the musical score display processing corresponding to a performance tempo of tones.

Furthermore, the instant embodiment can achieve the advantageous benefit that a musical score portion of an accurate position can always be displayed without being influenced by a change in tone reproduction tempo. FIG. 10 is a time chart showing examples of various operation timing of the musical score control processing and the musical score display processing responsive to a performance tempo of tones.

The music reproduction apparatus EM generates and transmits control information Cs at intervals of the time Δt without being influenced by a tone reproduction tempo. In the illustrated example of FIG. 10, the tone reproduction tempo from the twelfth measure to the thirteenth measure is temporarily speeded up, while the tone reproduction tempo from the fourteenth measure to the fifteenth measure is temporarily slowed down. As seen from FIG. 10, if the tone reproduction tempo is speeded up, the number of times control information Cs is transmitted during reproduction of tones of one measure decreases as compared to that before the speeding-up of the tone reproduction tempo. Namely, for example, whereas control information Cs is transmitted four times in signal t1 to signal t4 during reproduction of tones from the twelfth measure to the thirteenth measure before the speeding-up of the tone reproduction tempo, control information Cs is transmitted only once in signal t5 during reproduction of tones from the thirteenth measure to the fourteenth measure after the speeding-up of the tone reproduction tempo. Besides, if the time interval Δt at which audio signals are transmitted is a short time less than one second, information sufficient for performing musical score updating can be transmitted during reproduction of tones of one measure even if the tempo is speeded up. More specifically, in a case where tones of quadruple time are reproduced at a tempo of "120", and if the time interval at which control information Cs is transmitted is 0.5 seconds, then the information can be transmitted about three to four time per measure. If the tone reproduction tempo is slowed down, on the other hand, same control information Cs is merely repetitively transmitted at every predetermined time interval Δt, and thus, there occurs no problem with the musical score display control. Namely, with the prior art technique which has to acquire a tempo from performance data to extract a performed position, a considerable time would be required;

however, with the instant embodiment of the invention which periodically acquires a measure number indicative of "which measure is being currently reproduced" as display controlling information, musical score display control can be performed with good followability even when a tone reproduction tempo has been changed.

Addition of Music Content in the Music Content Display Apparatus (Information Processing Apparatus) DS Referring back to FIGS. 4 and 5, the determination section DC determines, on the basis control information Cs demodulated by the demodulation section DM, whether a sound signal (audio signal) received by the audio input section 7 satisfies a predetermined reception condition. If it has been determined that the received sound signal satisfies the predetermined reception condition, a process is performed for allowing displaying content to be additionally stored or made additionally usable. The predetermined reception condition may be a condition capable of ascertaining that the information processing apparatus DS is in a state capable of communicating with (i.e., in a state capable of receiving control information Cs from) the music reproduction apparatus EM which the music content display apparatus is dependent on. For example, the predetermined reception condition may include at least a condition that it should be ascertained that control information Cs is included in the sound signal (audio signal) received by the audio input section 7, i.e., that it should be ascertained that control information Cs has been extracted (demodulated) by the demodulation section DM. More specifically, the predetermined reception condition may be that (1) control information Cs has been received a predetermined number of times N, (2) a time interval at which a plurality of receptions of control information Cs have taken place is one second or less, and/or the like. In an example to be described below, it is assumed that condition (1) is employed as the predetermined reception condition. In this case, if the predetermined number of times N is set at 1, the predetermined reception condition is satisfied when control information Cs has been received for the first time. If the predetermined number of times N is set at 10, the predetermined reception condition is satisfied when control information Cs has been received a total of ten times successively or unsuccessively. Note that reception of the control information Cs may be checked by monitoring an output state, in the demodulation section DM, of the control information Cs or by monitoring an extracted state, in the information extraction section EX, the header information Hd.

Once the above-mentioned reception condition is satisfied, the music content display apparatus DS performs a displaying content addition process. The music content display apparatus DS implements the function as the music content display apparatus by installing a content display program, designed for implementing the instant embodiment, in a PDS (information processing apparatus) together with displaying content (musical score data). However, in order for the music content display apparatus DS to appropriately display content in accordance with an instruction given from the electronic music apparatus EM, the music content display apparatus DS has to appropriately perform the displaying content addition process. The displaying content addition process is constructed to perform any one of the following first and second functions depending on an initial stored state, in the displaying content storage section STd, of displaying content (e.g., musical score data). Namely, in the illustrated example, there are two types, i.e., first and second types, of the initial stored state, in the displaying content storage section STd, of displaying content (i.e., musical score data for displaying). The first function is performed if the displaying content is initially stored in the displaying content storage section STd in the first type (first-type initial stored state), while the second function is performed if the displaying content is initially stored in the displaying content storage section STd in the second type (second-type initial stored state).

(1) First Function; For each displaying content (musical score data) that is not prestored in the displaying content storage section STd of the music content display apparatus DS although it is "displaying content" (musical score data) corresponding to music piece data (reproducing music piece data) preset or prepared in advance (or built-in) in the electronic music apparatus EM, the first function automatically acquires the lacking displaying content from the server SV as "additional displaying content" and additionally stored into the displaying content storage section STd.

(2) Second Function: For each displaying content (musical score data) currently set in an "non-usable state" although it is displaying content (musical score data) corresponding to music piece data (reproducing music piece data) preset in the electronic music apparatus EM and prestored in the displaying content storage section STd of the music content display apparatus DS, the second function updates the displaying content in question to a "usable state" (i.e., changes the usability state setting to the "usable state") to thereby increase the number of usable displaying content (musical score data sets).

The First Function of the Music Content Display Apparatus

In order to perform the aforementioned first function, the music content display apparatus DS includes an additional acquisition section AD and a communication section CM. The additional acquisition section AD is implemented mainly by the CPU 1 of the music content display apparatus DS, and the communication section CM is implemented mainly by the communication I/F 8 of the music content display apparatus DS.

More specifically, the aforementioned first-type initial storage state where the first function is performed is a state in which, whereas p items or sets of usable (reproducible) music piece data (i.e., p sets of reproducing music piece data sets) are preset in the music piece data storage section STe of the electronic music apparatus EM, only r (p>r≥0) sets of displaying content (musical score data sets) are prestored in the displaying content storage section STd of the music content display apparatus DS. In order to perform the first function, for example, on a newly-purchased music content display apparatus DS, the user activates both the newly-purchased music content display apparatus DS and the electronic music apparatus EM, instructs reproduction of desired music piece data and also selects the automatic score page turning function. Then, a sound signal As having mixed therein an audio signal including control information Cs is transmitted from the electronic music apparatus EM to the music content display apparatus DS in response to reproduction of the music piece data. Thus, the music content display apparatus DS determines, by means of the determination section DC, whether the audio signal included in the received sound signal As satisfies the predetermined reception condition. If the determination section DC has determined that the audio signal included in the received sound signal As satisfies the predetermined reception condition, it means the determination section DC has ascertained that the newly-purchased music content display apparatus DS is in the state capable of receiving, from the electronic music apparatus EM, an audio signal including appropriate control information Cs, which also means that the user possessing the newly-purchased music content display apparatus DS possesses the electronic music apparatus EM suiting the newly-purchased music content display apparatus DS and that security for music content (displaying content) protection has been confirmed. In response to such ascertainment and confirmation, the music content display apparatus DS performs "displaying content addition process A". In "displaying content addition process A", "p−r" item or set of displaying content (i.e., musical score data) that corresponds to any one of p sets of music content (music piece data set) preset or built-in in the electronic music apparatus EM but is other than r sets of displaying content prestored in the storage section STd is automatically acquired from the server SV via the communication section CM and additionally stored into the storage section STd. Such "p−r" item or set of displaying content (i.e., "p−r" set of musical score data) thus added to the storage section STd is referred herein to as "additional displaying content (musical score data set)".

Namely, the determination section DC determines whether or not additional acquisition of displaying content is possible, and once it is determined that the aforementioned predetermined reception condition is satisfied, the determination section DC instructs the additional acquisition section AD to acquire the above-mentioned additional displaying content (musical score data set) from the server SV. In response to such an instruction, the additional acquisition section AD acquires the above-mentioned (acquisition-instructed) additional displaying content from the server SV via the communication section CM over the communication network and stores the additional displaying content into the displaying content storage section STd.

The aforementioned first function of the music content display apparatus DS is summarized as follows. The music content display apparatus DS displays musical score data in response to the electronic music apparatus EM reproducing music piece data; however, at an initial stage, only r (p>r≥0) sets of preset displaying content (musical score data) are prestored in the music content display apparatus DS. The music content display apparatus DS first receives a sound signal As from the electronic music apparatus EM by means of the audio reception section 7 and the demodulation section DM. Then, once the music content display apparatus DS ascertains that it is in the state capable of receiving, from the electronic music apparatus EM, control information (score page turning signal) Cs included in the audio signal (i.e., that the reception condition is satisfied), it identifies, as "additional displaying content", an item or set of displaying content that corresponds to any of p sets of music piece data but is other than the sets of preset displaying content (musical score data) and permits acquisition of the additional displaying content (by means of the determination section DC). Then, the additional acquisition section AD acquires the permitted additional displaying content (musical score data set) from the server SV and additionally stores the acquired additional displaying content into the displaying content storage section STd. Then, the information extraction section EX references the music piece ID information Si and reproduced position information (measure number) Bn extracted from the control information (score page turning signal) Cs, and the display control section CTd reads out, from the displaying content storage section STd, the displaying content (musical score data) corresponding to the extracted music piece ID information Si, the display control section CTd causes the display section 6 to display, on the display screen SC, a musical score portion corresponding to the extracted reproduced position information (measure number) Bn.

The Second Function of the Music Content Display Apparatus

In order to perform the aforementioned second function, the music content display apparatus DS performs "displaying content addition process B" by means of the determination section DC as shown in a functional block diagram of FIG. 5 and thereby updates music content in the non-usable state, included in the music content (musical score data) prestored in the displaying content storage section STd, to the usable state.

More specifically, the aforementioned second-type initial storage state where the second function is performed as noted above is a state where p sets of displaying content (musical score data) are also prestored in the displaying content storage section STd of the music content display apparatus DS in correspondence with p sets of usable (reproducible) music piece data preset or built-in in the music piece data storage section STe of the electronic music apparatus EM, and where s (p>s≥0) sets of displaying content (musical score data) of the prestored p sets of displaying content are set in the usable (displayable) state while the remaining "p−s" sets of displaying content (musical score data) are set in the non-usable state. In order to perform the second function, a sound signal As including control information Cs is transmitted from the electronic music apparatus EM to the music content display apparatus DS in response to reproduction of music piece data in a similar manner to the aforementioned. Then, the music content display apparatus DS determines, by means of the determination section DC, whether the received sound signal As satisfies the predetermined reception condition. Once the determination section DC ascertains that the music content display apparatus DS is in the state capable of receiving the control information Cs from the electronic music apparatus EM, the music content display apparatus DS performs "displaying content addition process B". In "displaying content addition process B", the determination section DC determines whether sets of displaying content (musical score data) currently stored in the displaying content storage section STd are in the usable state or in the non-usable state, and it updates all of the "p−s" sets of displaying content (musical score data), having been ascertained to be in the non-usable state, to the usable (displayable) state. The "p−s" sets of displaying content (musical score data) having been thus updated usable state can be said to be "usable additional displaying content (musical score data)".

Namely, the determination section DC determines whether content in the non-usable state can be changed to the usable state, and once it is determined that the aforementioned predetermined reception condition is satisfied, the determination section DC determines whether the sets of displaying content (musical score data) currently stored in the displaying content storage section STd are in the usable state or in the non-usable state, and it updates all of the sets of displaying content (musical score data), having been ascertained to be in the non-usable state, to the usable (displayable) state. By being newly set in the usable (displayable) in the aforementioned manner, the sets of displaying content (musical score data) have been added to the displaying content storage section STd as displayable content.

The aforementioned second function of the music content display apparatus DS is summarized as follows. In order for the music content display apparatus DS to display musical score data in response to the electronic music apparatus EM reproducing music piece data, corresponding displaying content (musical score data set) is prestored in the displaying content storage section STd; however, at an initial stage, s sets of displaying content (musical score data) less than the p sets of music piece data preset in the electronic music apparatus EM (p>s≥0) are set in the usable state, while the remaining "p−s" sets of displaying content (musical score data) are set in the non-usable state. The music content display apparatus DS first receives a sound signal As from the electronic music apparatus EM by means of the audio reception section 7 and the demodulation section DM. Then, once the music content display apparatus DS ascertains that it is in the state capable of receiving, from the electronic music apparatus EM, control information (score page turning signal) Cs included in the audio signal (i.e., that the reception condition is satisfied), the determination section Dc updates all of the remaining (p−s) sets of displaying content from the non-usable state to the usable (displayable) state. Then, the information extraction section EX references the music piece ID information Si and reproduced position information (measure number) Bn extracted from the control information (score page turning signal) Cs, and the display control section CTd reads out, from the displaying content storage section STd, the displaying content (musical score data) corresponding to the extracted music piece ID information Si, and the display control section CTd causes the display section 6 to display, on the display screen SC, a musical score portion corresponding to the extracted reproduced position information (measure number) Bn.

Example Behavior

FIGS. 15A to 18 are flow charts of displaying content display processing. Note that "✕1" shown at a right upper corner of a block of step P1 in FIG. 16 indicates that step P1 can be omitted when the second function is to be performed, and that "✕2" shown at a right upper corner of a block of step P2 in FIG. 16 and shown at right upper corners of blocks of steps Q3 and Q5 in FIG. 17 indicate that these steps can be omitted when the first function is to be performed.

Figure 15A:
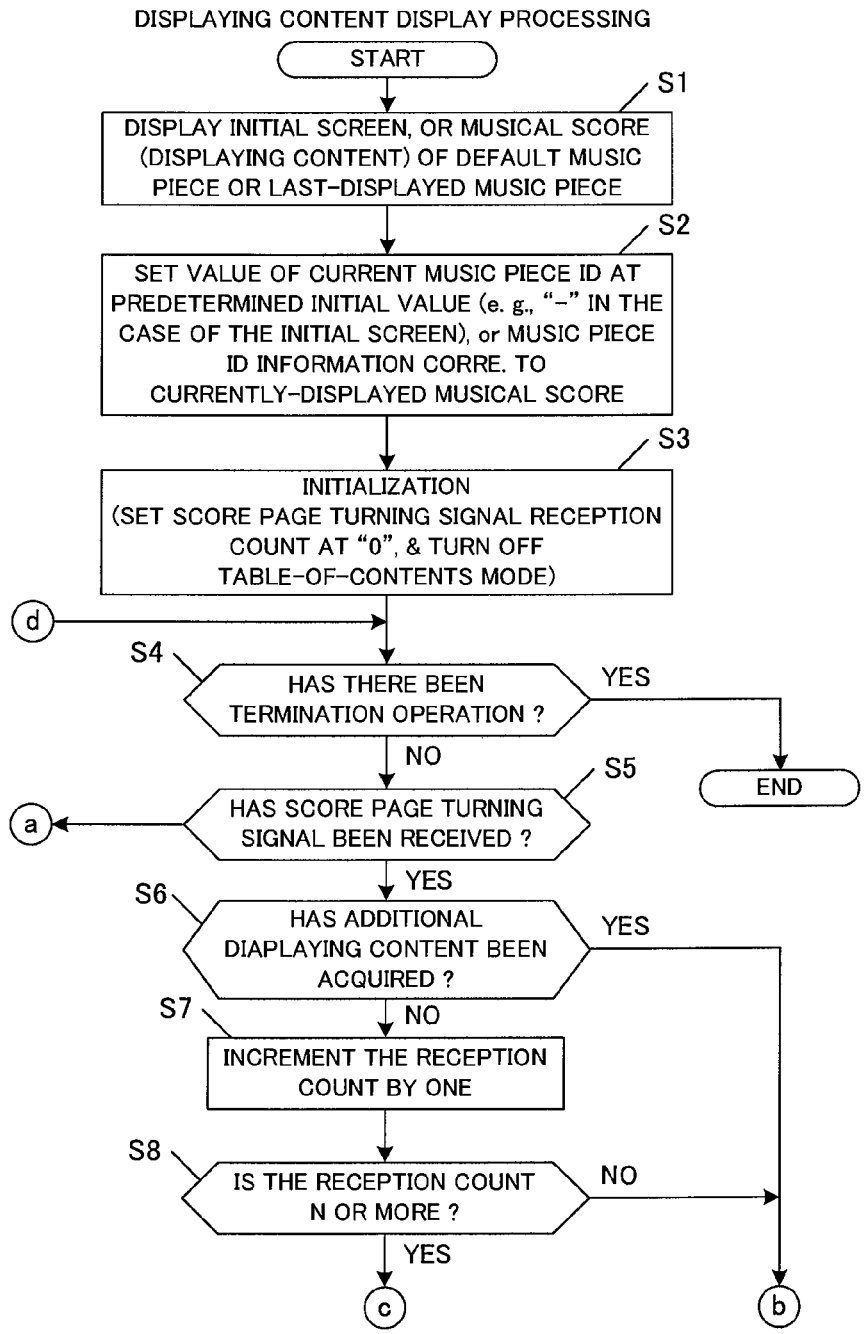
FIG. 15A and FIG. 15B are a flow chart of displaying content display processing in the embodiment of the present invention.
Figure 15B:
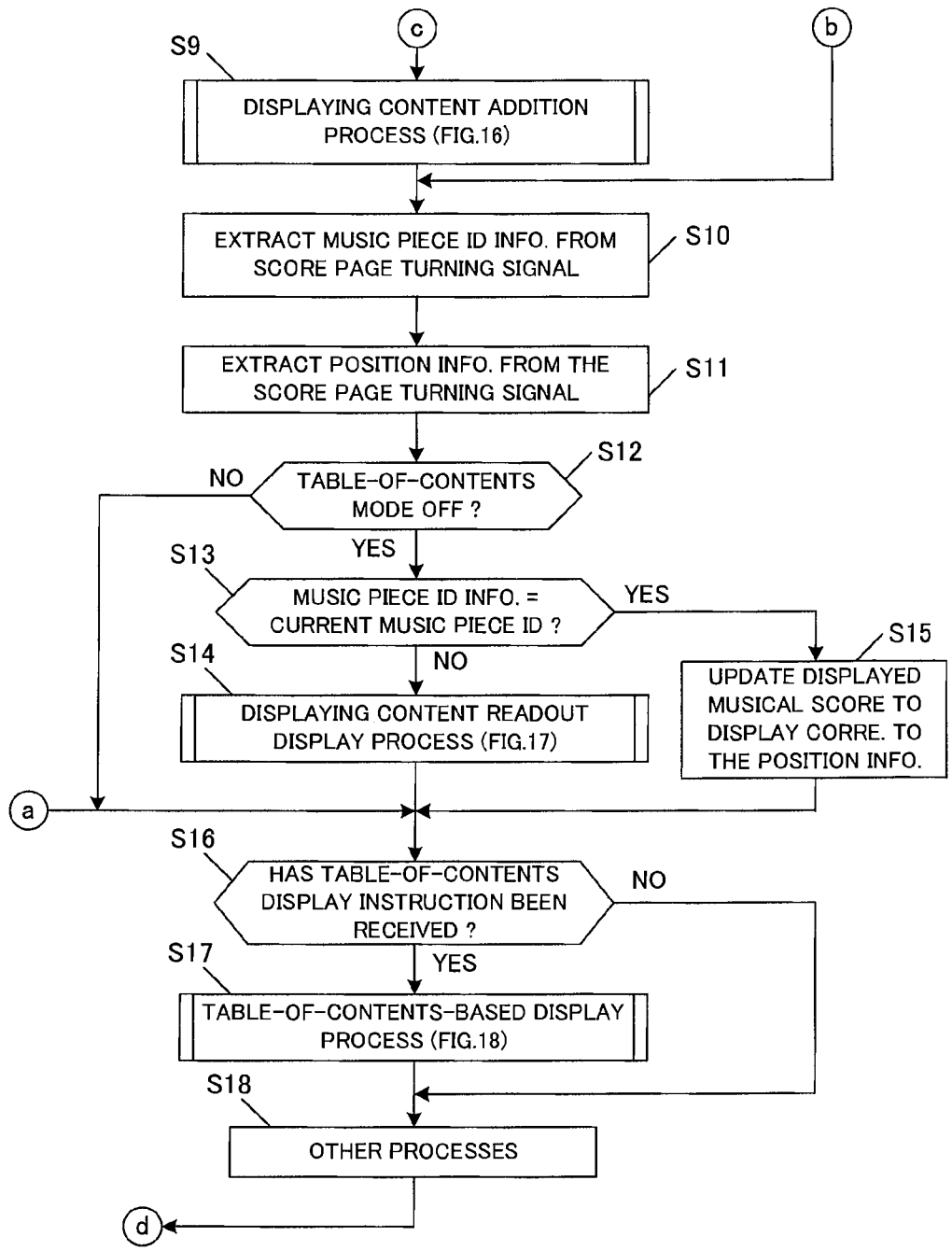

Upon powering-on of the music content display apparatus DS or upon start-up of the displaying content display processing program, the displaying content display processing shown in FIGS. 15A and 15B is started up. FIGS. 15A and 15B are interconnected via connection points a, b, c and d. First, at step S1 in FIG. 15A, the CPU 1 displays, on the display screen SC, either a predetermined initial screen or a musical score (displaying content) of a default music piece or a music piece that was being displayed on the last execution of the displaying content display processing program. At next step S2, a value of variable "current music piece ID" is set at (1) a predetermined value (not present in music piece ID information Si, such as "-" in the case of an initial screen display), or (2) a value of music piece ID information Si of the music piece corresponding to the currently-displayed musical score. If the music piece ID of a set of displaying content (music piece data) preset in the electronic music apparatus EM and the music piece ID of a corresponding set of displaying content (musical score data) differ from each other, the display control may be performed using any one of the two music piece IDs. The "current music piece ID" is a variable indicative of a musical score to be displayed. Then, initialization is performed at step S3, in which, for example, the score page turning signal reception count is set at "0" and the table-of-contents mode is turned off, and then the processing goes to step S4.

At step S4, a determination is made as to whether there has been a termination operation. If there has been not been a termination operation as determined at step 4 (NO determination at step S4), the processing proceeds to step S5 to further determine whether a score page turning signal (i.e., control information Cs) has been received.

If a score page turning signal has been received (YES determination at step S4), the processing goes to step 6 to further determine whether additional displaying content has been acquired. In this case, a content acquisition flag may be set when additional displaying content has been acquired (step S9 in FIG. 15B) so that the content acquisition can be determined with reference to the content acquisition flag. Alternatively, the content acquisition can be determined with reference to a storage state of the displaying content storage section STd. If additional displaying content has not been acquired (NO determination at step S6), the processing goes to step S7 to increment the score page turning signal reception count by one. Further, at step S8, a determination is made as to whether the score page turning signal reception count is N (N is an integral number equal to or greater than one) or more. The increment and determination of the score page turning signal reception count is performed in a case where a determination rule is set for effecting additional acquisition once the score page turning signal Cs is received the predetermined number N of times. In a case where another determination rule is set, operations corresponding to the other determination rule are performed (setting of a determination rule at step S18 of FIG. 15B). When the score page turning signal reception count is N or more as determined at step S8 (YES determination at step S8), the processing goes to step S9 of FIG. 15B to perform "displaying content addition process" shown in FIG. 16.

Figure 16:
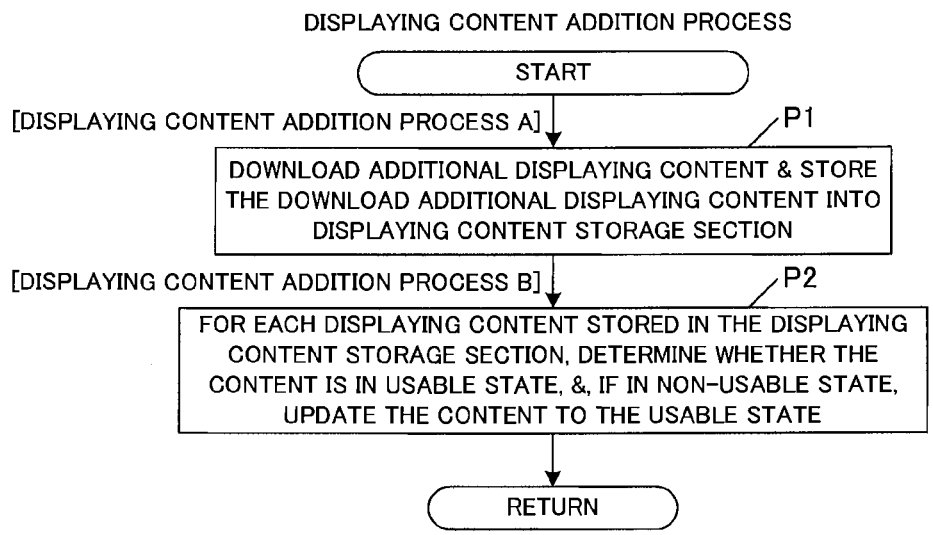
FIG. 16 is a flow chart of a displaying content addition process in the embodiment of the present invention.
Figure 17:
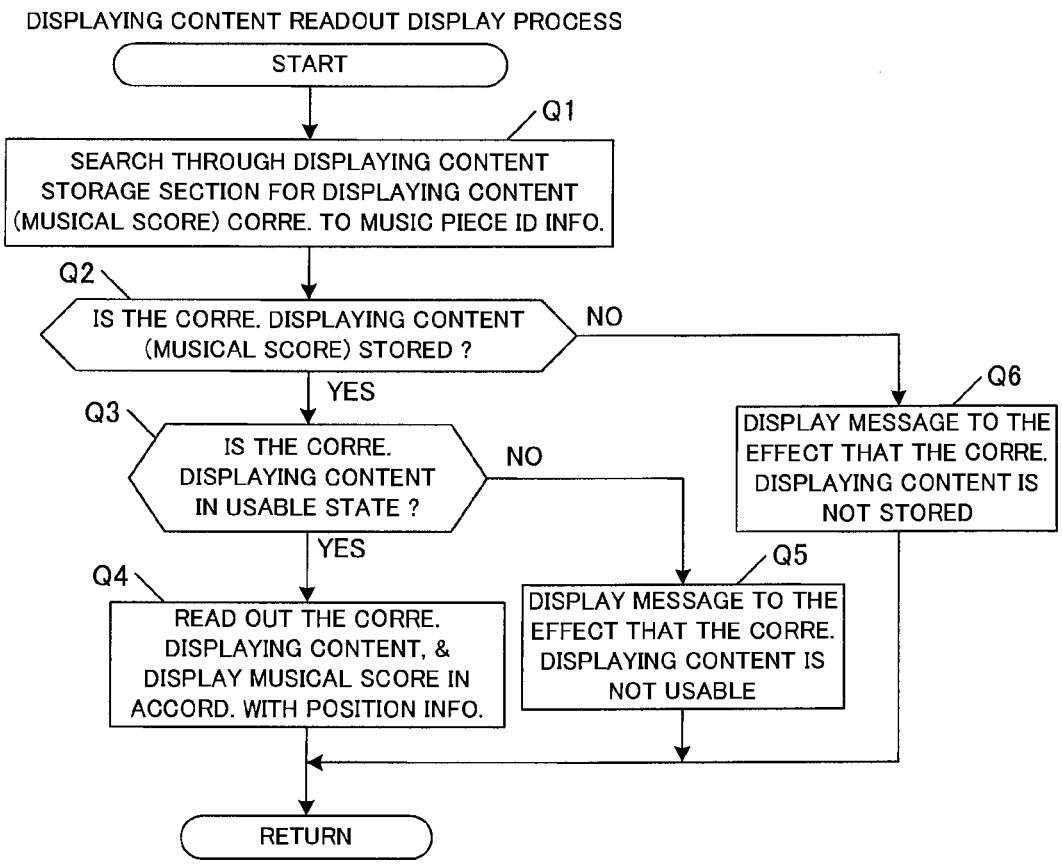
FIG. 17 is a flow chart of a displaying content readout display process in the embodiment of the present invention.

In the displaying content addition process shown in FIG. 16, when only the first function is to be performed, and if it has been determined that the score page turning signal reception count is N or more as determined at step S8 (YES determination at step S8), acquisition, from the server SV, of additional displaying content is permitted, so that the additional displaying content is downloaded from the server SV and stored into the displaying content storage section STd of the music content display apparatus DS (displaying content addition process A); in this case, step P2 is skipped. More specifically, for example, at step P1, a request for transmission of an additional "p−r" set of displaying content (musical score data) from the server SV is automatically issued, and the additional "p−r" set of music content transmitted from the server SV in response to the request is stored into the displaying content storage section STd. When only the second function is to be performed, on the other hand, step P1 is skipped, and then, at next step P2, a determination is made, for each of the displaying content stored in the displaying content storage section STd, as to whether the displaying content is in the usable state, and, if in the non-usable state, the displaying content is updated to the usable state (displaying content addition process B). Then, once the operations of steps P1 to P2 are completed, the content acquisition flag is set ON in the case where the determination as to whether the additional displaying content has already been acquired is made with reference to the content acquisition flag; otherwise (i.e., the determination as to whether the additional displaying content has already been acquired is not made with reference to the content acquisition flag), the instant displaying content addition process is brought to an end, after which control reverts to step S10 of FIG. 15B.

If the additional displaying content has been acquired as determined at step S6 of FIG. 15A (YES determination at step S6), and if the score page turning signal reception count is below N as determined at step S8 (NO determination at step S8), or when the displaying content addition process at step S9 FIG. 15B has been terminated, the processing proceeds to steps S10 and S11. First, the music piece ID information Si is extracted from the score page turning signal Cs at step S10, and the reproduced position information Bn is extracted from the score page turning signal Cs at step S11. Here, a measure number, page number or the like is used as the reproduced position information Bn. Following the extraction of the reproduced position information Bn, the processing proceeds to step S12.

At step S12, a determination is made as to whether the table-of-contents mode is currently set OFF. If the table-of-contents mode is currently set OFF (YES determination at step S12), a further determination is made, at step S10, as to whether the value of the music piece ID information Si extracted at step S10 matches the "current music piece ID". If the music piece ID information Si does not match the current music piece ID as determined at step S13 (NO determination at step S13), the processing goes to step S14 to perform a "displaying content readout display process" shown in FIG. 17.

At first step Q1 of the displaying content readout display process, the displaying content storage section STd is searched for an item or set of displaying content (musical score data set) corresponding to the music piece ID information Si extracted at step S10 of FIG. 15B, and at next step Q2, a determination is made as to whether the corresponding displaying content is currently stored in the displaying content storage section STd. If the corresponding displaying content is currently stored in the displaying content storage section STd (YES determination at step Q2), a further determination is made, at step Q3, as to whether the corresponding displaying content is in the usable state. If the corresponding displaying content is in the usable state (YES determination at step Q3), the process proceeds to step Q4, where the corresponding displaying content (musical score data set) is read out from the displaying content storage section STd, a musical score is displayed on the screen DS in accordance with the reproduced position information Bn extracted at step S11 of FIG. 15B, but also the current music piece ID is set at the music piece ID of the corresponding displaying content (musical score data set). If, on the other hand, the corresponding displaying content is in the non-usable state (NO determination at step Q3), the process branches to step Q5, where a message to the effect that the displaying content (musical score data set) is unusable is displayed on the screen SC.

Note that, when only the first function is to be performed, the process skips step Q3 to immediately proceed to step Q4 and does not perform step Q5. Namely, if the corresponding music content is currently stored in the displaying content storage section STd (YES determination at step Q2), the process immediately performs the operation of step Q4. If the corresponding displaying content is not currently stored in the displaying content storage section STd (NO determination at step Q2), the process branches to step Q6, where a message to the effect that the corresponding displaying content (musical score data set) is not currently stored is displayed on the screen SC. Upon completion of the operation of any one of steps Q4 to Q6, the instant displaying content readout display process is brought to an end, and control reverts to step S16 of the displaying content display processing flow of FIG. 15B.

Referring back to FIG. 15B, if the value of the music piece ID information Si extracted at step S10 matches the current music piece ID (YES determination at step S13), the processing goes to step S15 to update the musical score, displayed on the screen SC, to a display corresponding to the reproduced position information Bn extracted at step S11. The operation of step S15 is similar to the aforementioned operations of steps S35 and S36 of FIG. 8. Further, if no score page turning signal (i.e., control information Cs) has been received as determined at step S5 of FIG. 15A (NO determination at step S5), if the table-of-contents mode is currently set ON as determined at step S12 (NO determination at step S12), or when the operation of any one of step S14 and S15 has been completed, the processing proceeds to step S16. At step S16, a determination is made as to whether a table-of-contents display instruction given, for example, via the table-of-contents button to of FIG. 6 has been received. If such a table-of-contents display instruction has been received (YES determination at step S16), the processing proceeds to step S17, where a "table-of-contents-based display process" shown in FIG. 18 is performed.

Figure 18:
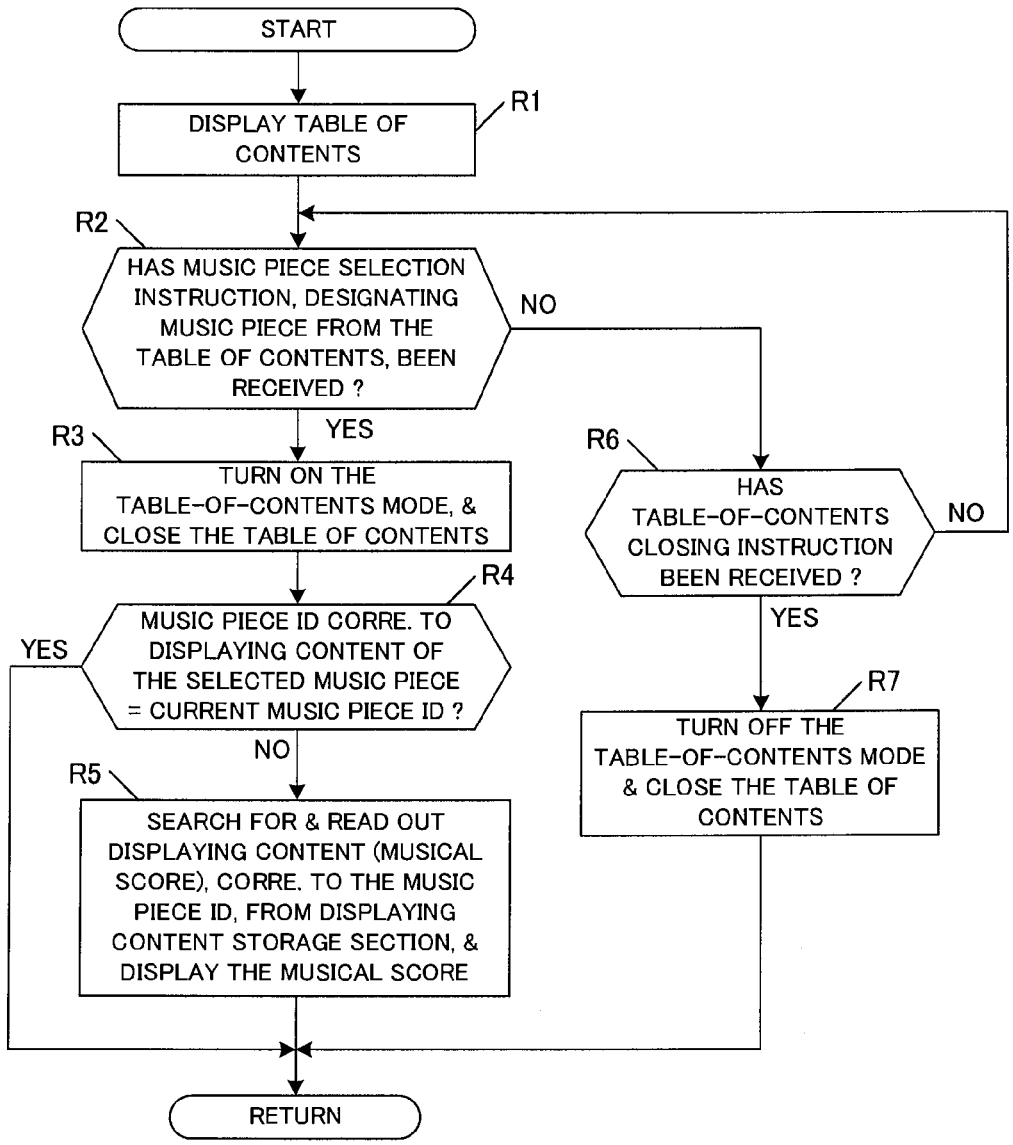
FIG. 18 is a flow chart of a table-of-contents-based display process in the embodiment of the present invention.

In the table-of-contents-based display process of FIG. 18, a table of contents (list of music pieces) is displayed on the display screen SC at first step R1, and then, a determination is made, at step R2, as to whether a music piece name selection instruction, which selects and designates a desired music piece from among a plurality of music pieces, has been received. If such a music piece name selection instruction has been received (YES determination at step R2), the process proceeds to step R3, where the table-of-contents mode is set ON (to set a musical score display independent of the score page turning signal) to close the display of the table of contents, after which the process moves to step R4. At step R4, a determination is made as to whether the music piece ID of the displaying content (musical score data set) of the selected music piece (hereinafter "music piece ID of the selected music piece") matches the current music piece ID. If the music piece ID of the selected music piece does not match the current music piece ID (NO determination at step R4), the process proceeds to step R5, where the displaying content (musical score data set) corresponding to the music piece ID is searched for and read out from the displaying content storage section STd so that the musical score is displayed but also the music piece ID of the selected music piece is set as the current music piece ID. After that the table-of-contents-based display process of FIG. 18 is brought to an end, upon which control reverts to step S18 (FIG. 15B) of the displaying content display processing flow.

If, on the other hand, the music piece ID of the selected music piece matches the current music piece ID (YES determination at step R4), the table-of-contents-based display process of FIG. 18 is directly terminated because the musical score represented by the displaying content (musical score data set) has already been displayed, and control reverts to step S18 of the displaying content display processing flow of FIG. 15B. Further, if a music piece name selection instruction has not been received (NO determination at step R2), the process branches to step R6. At step R6, a determination is made as to whether an instruction for closing the table of contents had been received, and, if such an instruction for closing the table of contents has not been received (NO determination at step R6), control reverts to step R2 to wait for reception of a music piece name selection instruction. Once such a music piece name selection instruction is received (YES determination at step R2), the operations of steps R3 to R5 are performed. However, if an instruction for closing the table of contents has been received without a music piece name selection instruction being received (YES determination at step R6), the table-of-contents mode is turned off to close the table of contents, and then the table-of-contents-based display process of FIG. 18 is brought to an end, upon which control reverts to step S18 (FIG. 15B) of the displaying content display processing flow.

Referring back to FIG. 15B, if a table-of-contents display instruction has not been received (NO determination at step S16), or when the table-of-contents-based process at step S17 has been brought to an end, other processes are performed at step S18. The other processes include, among other things, switching between ON/OFF settings of the table-of-contents mode (e.g., when the user wants to turn off the table-of-contents mode to switch to a musical score display based on a score page turning signal, without the table of contents is being displayed, from a state where a musical score selected from the table of contents is being displayed with the table-of-contents mode set ON), adjustment of the display screen SC, and setting of a reception condition determination rule at steps S7 and S8. Upon completion of the other processes, the processing reverts to step S4 to repeat the aforementioned operations of steps S4 to S18. Then, once it is determined at step S4 that there has been a termination operation (YES determination at step S4), the instant displaying content display processing is brought to an end.

Various Modifications and Supplementary Notes

Whereas the preferred embodiment of the invention has been described above with reference to the accompanying drawings, the present invention is not so limited, various modifications are of course possible. For example, various programs, such as the aforementioned musical score control processing program and the musical score display processing program may be implemented as microprograms executed by a DSP (Digital Software Processor) rather than computer software, or these processing may be implemented as dedicated hardware apparatus including discrete circuits or integrated circuitry or large-scale integrated circuitry, etc.

Further, the preferred embodiment of the invention has been described above as sounding tone and audio signals through a speaker as sound waves, but also performing score page turning control of a musical score, displayed on the external display device (i.e., display section 6 of the information processing apparatus DS), by receiving such signals via a microphone. However, the present invention is not so limited, and communication (transmission and reception) of an audio signal between the electronic music apparatus EM and the music content display apparatus DS may be performed either in a wired manner or in a wireless manner using another form of media than sound waves.

Further, the preferred embodiment of the invention has been described above as sounding, through a speaker, a signal having an audio signal superimposed on a tone signal. However, the present invention is not so limited, and all sounds generated from the electronic music apparatus EM, such as a singing voice input to a microphone, an operating sound generated as a setting operator is operated by a user, an alarm sound generated at the time of occurrence of an error, etc. may be sounded together through the speaker. Namely, any types of sounds may be output from the speaker as long as an audio signal is output from the speaker.

Further, the display control of the display section 6 in the music content display apparatus DS is not limited to the row-by-row score page turning control and may be any type of display control as long as portions of a musical score are updated sequentially, e.g., measure by measure, a plurality of measures by a plurality of measures, a plurality of rows by a plurality of rows, or half page by half page.

Further, the reproduced position information Bn need not necessarily be a measure number, and it may be MIDI information indicative of a measure, beat and clock or may be indicative of an elapsed reproduction time from the beginning of a music piece in an absolute time consisting, for example, of minute, second and millisecond. Further, music piece data may be audio data rather than MIDI data, in which case information indicative of a elapsed reproduction time as noted above may be used as the reproduced position information Bn.

Furthermore, the preferred embodiment of the invention has been described above as generating digital control information Cs, which includes a music piece ID and reproduced position information Bn, and modulating an audio signal of a predetermined frequency band with the control information Cs. However, the present invention is not so limited, and the audio signal of the predetermined frequency band may logically carry the control information Cs; namely, it is only necessary that the invention be constructed such that the control information Cs of what data content is being carried by the audio signal of the predetermined frequency band can be logically seen. For example, a plurality of audio signals of characteristics (frequencies or amplitudes) corresponding to individual music piece IDs and individual reproduced position information Bn (measure numbers) may be prestored so that an audio signal having predetermined characteristics corresponding to an extracted music piece ID and reproduced position information Bn (measure number) can be generated and output for carrying the control information Cs. In this case, in the information processing apparatus, a conversion table defining correspondency between audio signals of various characteristics and music piece IDs and reproduced position information Bn (measure numbers) may be pre-stored so that a music piece ID and reproduced position information Bn (measure number) can be extracted by reference to the conversion table on the basis of a received audio signal.

Note that displaying content to be displayed on the external display device (i.e., display section 6 of the information processing apparatus DS) may be any type of content, such as lyrics or fingering instructions of a performance operator, rather than a staff, tablature or chords score, as long as the displaying content need to be switched from one display to another in accordance with a progression of reproduction of a music piece. As another example, the displaying content may be comics, story or the like whose scene is switched from one to another in accordance with a progression of reproduction of a music piece. Further, the displaying content may be in the form of any desired data, such as image data or text data.

Furthermore, control information Cs carried by a periodically-transmitted audio signal need not necessarily include music piece information (music piece ID), and such music piece information (music piece ID) may be included in control information Cs at least at the beginning of reproduction of the music piece. Namely, the control information Cs need not simultaneously include music piece information (music piece ID) and reproduced position information Bn and may include any one of the music piece information (music piece ID) and reproduced position information Bn as required at individual display timing. This is because, if first-received music piece information (music piece ID) is stored in the information processing apparatus DS, score page turning can be performed during reproduction of the same music piece only by receipt of reproduced position information Bn.

Furthermore, a plurality of types of displaying content (musical score data sets) (corresponding, for example, to performance skill levels of users of electronic music apparatus) may be prestored in relation to a music piece or a music piece data set. Furthermore, the displaying music content (musical score data sets) may comprise any form of data, such as logical data, image data, or the like. In the case where the displaying content (musical score data sets) comprises musical score logical data, for example, musical score displaying data are generated on the basis of the musical score logical data at the time of displaying of the musical score.

Furthermore, displaying content can be displayed as long as at least information capable of identifying the displaying content, such as a music piece ID, is included in control information Cs superimposed on a sound signal received from the electronic music apparatus EM. Further, if time information, such as a measure position, of the displaying content to be displayed is included in the control information Cs, such time information can be used at the time of displaying of the music content. Further, an audio signal for carrying control information Cs may be of other than the frequency band of about 18 kHz, such as a frequency band poorly audible to the human ear or a frequency band easily audible to the human ear, and the audio signal may be adjustable in both frequency band and volume level.

When a user has purchased an electronic music apparatus EM, having the reproducing music piece data set preset, prepared in advance or built-in therein, together with a displaying content display program and part of displaying content (displaying music-piece-associated data, such as musical score data and music-piece guiding illustration data), the aforementioned first function of the music content display apparatus DS allows the music content display apparatus DS to additionally acquire displaying content (displaying music-piece-associated data) corresponding to music piece data reproduced by the electronic music apparatus EM and thereby enhance the additional advantageous benefit that displaying content (displaying music-piece-associated data) corresponding to all items or sets of music piece data preset in the user-purchased electronic music apparatus EM can be displayed. In addition, security of the displaying content (displaying music-piece-associated data, such as musical score data) can be secured.

In the case where control information Cs carried by an audio signal is a score page turning signal output at predetermined time intervals (e.g., every 0.5 seconds), it can be used not only for an actual score page turning function but also for additional acquisition of displaying content (musical score data). Note that the present invention is not limited to the above-described embodiment where displaying content (musical score data) is displayed as instructed by control information Cs transmitted from the electronic music apparatus EM, and displaying content (musical score data set) selected through a user's selection operation on the music content display apparatus DS may be displayed.

When additional displaying content has been acquired from the server according to the aforementioned first function of the music content display apparatus DS, that the additional displaying content has been downloaded from the server may be displayed, for example, in a message form. Further, although the operation for acquiring additional displaying content may be automatically performed at step P1 of FIG. 16 as noted above, the present invention is not so limited, and, for example, step P1 of FIG. 16 may be arranged to only inform the user, through a visual display or otherwise, that downloading, from the server SV, of additional displaying content has become possible and cause the user to give an actual acquisition instruction. For example, in such a case, a downloading execution button may be displayed on the screen so that desired downloading is executed in response to a user's operation of the downloading execution button.

Furthermore, displaying content corresponding to the type of the music content display apparatus may be automatically downloaded from the server. Alternatively, the music content display apparatus may be automatically connected to a site having downloading additional displaying content posted thereon so that the additional displaying content can be downloaded to the music content display apparatus. As another alternative, if a means is provided for identifying a transmission source of an input sound signal (e.g., if the input sound includes information of the transmission source), only music content fitting the transmission source may be automatically supplied to the music content display apparatus.

Although timing for downloading, by the music content display apparatus, of additional content (image data), from the server may be when a score page turning signal has been received for the first time, such timing may also be when it could be ascertained for the first time that the music content display apparatus has been in a communicating state with the electronic music apparatus EM (that is a transmitting end of a score page turning signal) for a predetermined time period measured, for example, in seconds or for a predetermined time period corresponding to a predetermined number of times of signal reception. At any rate, it is only necessary that a downloading-permitting state occur while a user is using the electronic music apparatus in an ordinary manner, rather than the user consciously transmitting a signal intended for acquisition of additional content.

Further, in consideration of a possible case where even a non-purchaser of the electronic music apparatus (electronic musical instrument) can obtain the music content display apparatus and/or the displaying content display program, it is preferable that the displaying content display program have recorded therein minimum displaying content (displaying music-piece-associated data). Namely, a provider of the electronic music apparatus (electronic musical instrument) wants a purchaser of the electronic music apparatus to use, as a part of the value or benefit of the electronic music apparatus, all items or sets of displaying content (displaying music-piece-associated data) corresponding to sets of reproducing music piece data recorded therein as built-in music pieces, and thus, when control information from the electronic music apparatus could be received once or more times, the user of the music content display apparatus may be regarded as a purchaser of the electronic music apparatus so that lacking (additional) displaying content (displaying music-piece-associated data) can be downloaded to the music content display apparatus.

An audio signal received from the electronic music apparatus has been described above as a sound signal having control information Cs superimposed thereon. Alternatively, a reproduced output of a demonstration music piece prestored in the electronic music apparatus may be analyzed over several measures so that acquisition of additional displaying content is permitted when the reproduced music piece could be identified to be a demonstration music piece by the music content display apparatus.

Whereas the music content display apparatus has been described above in relation to the case where it performs only the first function or the second function, the music content display apparatus may perform both of the first and second functions in a combined manner using a combination of schemes employed in the first and second functions. For example, assume a case where p sets of usable reproducing music piece data are preset in the electronic music apparatus while q (less than p, i.e., p>q) sets of displaying content (displaying music-piece-associated data) are prestored in the music content display apparatus, and where s sets of the p sets are set in the usable state while the remaining (q−s) sets are set in the non-usable state. In such a case, when a state capable of communicating with the electronic music apparatus has been confirmed, the music content display apparatus acquires "p−q" usable displaying content (displaying music-piece-associated data) from the server and updates the (q−s) sets, previously set in the non-usable state, to the usable state.

This application is based on, and claims priorities to, JP PA 2011-208307 filed on 25 Sep. 2011 and JP PA 2011-209117 filed on 26 Sep. 2011. The disclosure of the priority applications, in its entirety, including the drawings, claims, and the specification thereof, are incorporated herein by reference.

What is claimed is:

1. A music content display apparatus for operating in relation to an external electronic music apparatus, the music content display apparatus comprising:
   a storage section storing displaying content related to music;
   an interface configured to provide communication with a server for supplying displaying content via a communication network;
   a reception section configured to receive a signal transmitted by the electronic music apparatus;
   a determination section configured to determine whether the signal received by the reception section satisfies a predetermined condition;
   an additional acquisition section configured to, when the determination section has determined that the signal satisfies the predetermined condition, access, via the interface, the server to acquire additional displaying content, which is additionally stored in the storage section; and
   a display control section configured to selectively read the displaying content from the storage section and display the read displaying content on a display section,
   wherein displaying content smaller in number than displaying content usable by the external electronic music apparatus is preset in the storage section, and
   wherein the additional displaying content contains displaying content other than the preset displaying content usable by the external electronic music apparatus.

2. The music content display apparatus as claimed in claim 1, wherein:
   the reception section receives, from the external electronic music apparatus, a signal including control information for controlling displaying of displaying content, and
   the display control section controls displaying of the displaying content corresponding to the control information.

3. The music content display apparatus as claimed in claim 2, wherein the predetermined condition includes at least a condition of the control information included in the received signal.

4. A computer-implemented method of automatically adding displaying content to be stored into a storage section in relation to an external electronic music apparatus, the storage section storing displaying content related to music, the method comprising:
   a reception step of receiving a signal transmitted by the electronic music apparatus;
   a determination step of determining whether the signal received by the reception step satisfies a predetermined condition;
   an acquisition step of, when the determination step has determined that the signal satisfies the predetermined condition, accessing a server for supplying displaying content via a communication network to acquire additional displaying content, which is additionally stored into the storage section; and
   a display step of selectively reading out displaying content from the storage section and displaying the read-out displaying content on a display section,
   wherein displaying content smaller in number than displaying content usable by the external electronic music apparatus is preset in the storage section, and
   wherein the additional displaying content contains displaying content other than the preset displaying content usable by the external electronic music apparatus.

5. A non-transitory computer-readable medium containing a program executable by a computer to perform a method of automatically adding displaying content to be stored into a storage section in relation to an external electronic music apparatus, the storage section storing displaying content related to music, the method comprising:
   a reception step of receiving a signal transmitted by the electronic music apparatus;
   a determination step of determining whether the signal received by the reception step satisfies a predetermined condition;
   an acquisition step of, when the determination step has determined that the signal satisfies the predetermined condition, accessing a server for supplying displaying content via a communication network to acquire additional displaying content, which is additionally stored into the storage section; and
   a display step of selectively reading out displaying content from the storage section and displaying the read-out displaying content on a display section,
   wherein displaying content smaller in number than displaying content usable by the external electronic music apparatus is preset in the storage section, and
   wherein the additional displaying content contains displaying content other than the preset displaying content usable by the external electronic music apparatus.

6. A music content display apparatus for operating in relation to an external electronic music apparatus and a server for supplying displaying content, the music content display apparatus comprising:
- a storage device storing displaying content related to music;
- a communication interface configured to communicate with the server via a communication network;
- an audio reception section, including an audio input device, configured to receive a signal transmitted by the electronic music apparatus; and
- a processor configured to execute:
  - a determination task that determines whether the signal received by the audio reception section satisfies a predetermined condition;
  - an additional acquisition task that, when the determination task determines that the signal satisfies the predetermined condition, access, via the communication interface, the server to acquire additional displaying content, which is stored in the storage device; and
  - a display control task that selectively reads the displaying content from the storage device and displays the read displaying content on a display device, wherein displaying content smaller in number than displaying content usable by the external electronic music apparatus is preset in the storage device, and wherein the additional displaying content contains displaying content other than the preset displaying content usable by the external electronic music apparatus.

7. The music content display apparatus as claimed in claim 6, wherein:
- the audio reception section receives, from the external electronic music apparatus, a signal including control information for controlling displaying of displaying content, and
- the display control task controls displaying of the displaying content corresponding to the control information.

8. The music content display apparatus as claimed in claim 6, wherein the predetermined condition includes at least a condition of the control information included in the received signal.

* * * * *